United States Patent
Broad et al.

(10) Patent No.: US 12,164,182 B2
(45) Date of Patent: Dec. 10, 2024

(54) CONTACT LENS

(71) Applicant: CooperVision International Limited, Fareham (GB)

(72) Inventors: Robert Andrew Broad, Hampshire (GB); Yuwen Liu, Dublin, CA (US); William Mitchell, Chandler's Ford (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 553 days.

(21) Appl. No.: 17/463,574

(22) Filed: Sep. 1, 2021

(65) Prior Publication Data

US 2022/0075210 A1 Mar. 10, 2022

Related U.S. Application Data

(60) Provisional application No. 63/076,538, filed on Sep. 10, 2020.

(51) Int. Cl.
G02C 7/10 (2006.01)
B29D 11/00 (2006.01)
(Continued)

(52) U.S. Cl.
CPC ........ *G02C 7/104* (2013.01); *B29D 11/00048* (2013.01); *B29D 11/00067* (2013.01);
(Continued)

(58) Field of Classification Search
CPC .......... G02C 7/104; G02C 7/108; G02C 7/04; G02C 7/049; B29D 11/00048;
(Continued)

(56) References Cited

U.S. PATENT DOCUMENTS 4,143,949 A 3/1979 Chen
4,997,897 A 3/1991 Melpolder
(Continued)

FOREIGN PATENT DOCUMENTS

CN 103959140 A 7/2014
CN 105254869 A 1/2016
(Continued)

OTHER PUBLICATIONS

International Search Report and Written Opinion issued in corresponding International Patent Application No. PCT/GB2021/052297 dated Dec. 6, 2021 (12 pages).
(Continued)

*Primary Examiner* — Tuyen Tra
(74) *Attorney, Agent, or Firm* — Kilyk & Bowersox, P.L.L.C.

(57) ABSTRACT

The present disclosure provides a contact lens comprising a first colourant which is a blue-blocking colourant having an absorption maximum ($\lambda_{max}$) in the range of from 415 nm to 455 nm and a second colourant, wherein the second colourant is a polymerizable dye having an absorption maximum ($\lambda_{max}$) in the range of from 470 nm to 600 nm, and optionally also comprising a third colourant which is a colourant having an absorption maximum in the range of from greater than 600 nm to 800 nm. A method of making the lens is also provided.

22 Claims, 2 Drawing Sheets

(51) Int. Cl.
*C09B 1/20* (2006.01)
*C09B 1/503* (2006.01)
*G02B 1/04* (2006.01)
*B29K 105/00* (2006.01)

(52) U.S. Cl.
CPC ............ *C09B 1/205* (2013.01); *C09B 1/5035* (2013.01); *G02B 1/043* (2013.01); *G02C 7/108* (2013.01); *B29K 2105/0032* (2013.01)

(58) Field of Classification Search
CPC ........ B29D 11/00067; B29D 11/00913; B29D 11/00038; C09B 1/205; C09B 1/5035; C09B 1/325; C09B 1/5145; G02B 1/043; B29K 2105/0032
USPC ......... 351/41, 159.01, 159.02, 159.24, 159.3
See application file for complete search history.

(56) References Cited

U.S. PATENT DOCUMENTS

| | | | |
|---|---|---|---|
| 5,055,602 | A | 10/1991 | Melpolder |
| 5,470,932 | A | 11/1995 | Jinkerson |
| 5,760,100 | A | 6/1998 | Nicolson et al. |
| 6,867,245 | B2 | 3/2005 | Iwata et al. |
| 7,426,993 | B2 | 9/2008 | Coldrey et al. |
| 7,582,327 | B2 | 9/2009 | Qiu et al. |
| 7,841,716 | B2 | 11/2010 | McCabe et al. |
| 7,854,866 | B2 | 12/2010 | Atkinson et al. |
| 8,231,218 | B2 | 7/2012 | Hong et al. |
| 8,277,700 | B2 * | 10/2012 | Zhang ............... C09K 9/02 351/159.01 |
| 8,658,747 | B2 | 2/2014 | Liu et al. |
| 9,740,028 | B1 * | 8/2017 | Larson ............... G02B 5/208 |
| 2007/0216861 | A1 | 9/2007 | Ishak et al. |
| 2008/0137030 | A1 | 6/2008 | Hoffman |
| 2011/0092659 | A1 | 4/2011 | McKenna et al. |
| 2014/0362339 | A1 | 12/2014 | Imafuku |
| 2017/0218203 | A1 | 8/2017 | Harada et al. |
| 2018/0243080 | A1 | 8/2018 | Chien |
| 2020/0054555 | A1 * | 2/2020 | Rout ............... A61K 9/0051 |

FOREIGN PATENT DOCUMENTS

| | | |
|---|---|---|
| EP | 2514791 A1 | 10/2012 |
| EP | 3168675 A1 | 5/2017 |
| GB | 1400892 A | 7/1975 |
| JP | 2005023294 A | 1/2005 |
| JP | 2006141206 A | 6/2006 |
| JP | 2014196500 A | 10/2014 |
| JP | 2016034994 A | 3/2016 |
| JP | 2016060755 A | 4/2016 |
| JP | 2019038880 A | 3/2019 |
| WO | 0014592 A1 | 3/2000 |
| WO | 2011074501 A1 | 6/2011 |
| WO | 2020176444 A1 | 9/2020 |

OTHER PUBLICATIONS

"Blue Light Hazard: New Knowledge, New Approaches to Maintaining Ocular Health," Report of a Roundtable, Mar. 16, 2013 (12 pages).

Office Action issued in corresponding Chinese Patent Application No. 202180058389.3 issued Sep. 15, 2023 (with English translation) (15 pages).

Office Action issued in corresponding Japanese Patent Application No. 2023-506499 mailed Aug. 9, 2023 (with partial English translation) (9 pages).

Office Action issued in corresponding Taiwan Patent Application No. 110133497 dated Dec. 29, 2022 (with English translation) (7 pages).

Notice of Opposition issued in corresponding European Patent Application No. 21782580.1 dated Sep. 5, 2024 (18 pages).

"Basic Color Theory," Walter Foster Publishing, 2018, ISBN: 978-1-63322-590-9 (9 pages).

Datasheets for Exciton ABS 549, Exciton ABS 420, Epolight 5821, Eplight 5838, Epolight 5636, and Epolight 5411, https://exciton.luxottica.com/absorber-dyes.html and https://epolin.com/epolin_product/nir-and-visible-absorbing-dyes-thermoplastics/ (6 pages) (May 2013, Sep. 2017, Jul. 2017, and Aug. 2013).

Package Insert/Fitting Guide for Bausch + Lomb PureVision 2, Visibility Tinted Contact Lenses, Jun. 2016 (1 page).

* cited by examiner

CONTACT LENS

This application claims the benefit under 35 U.S.C. § 119(e) of prior U.S. Provisional Patent Application No. 63/076,538, filed Sep. 10, 2020, which is incorporated in its entirety by reference herein.

FIELD OF THE PRESENT DISCLOSURE

The present disclosure concerns contact lenses, in particular contact lenses comprising a colourant for blocking blue light. More particularly, but not exclusively, this invention concerns contact lenses comprising such a first colourant for blocking blue light and also a separate second colourant for colour balancing the first colourant, and methods of making the same.

BACKGROUND

Over the years the development of contact lenses has led to the addition of new features beyond refraction correction. One feature that is desired is the blocking of potentially harmful blue light. The human eye responds to light in the visible spectrum (380-780 nm). However, the shorter wavelengths contain the greater energy and so pose the greatest hazard to human health. This so-called High Energy Visible Light has wavelengths between 380-500 nm. However, blue light is important to visual processes including colour perception and in recent years it has been shown that blue light between 465-495 nm plays an essential role in the circadian rhythm of humans. It has also been shown (Blue Light Hazard: New Knowledge, New Approaches to Maintaining Ocular Health, Report of a Roundtable, Mar. 16, 2013.) that the greatest phototoxic damage occurs with blue light of wavelengths between 415-455 nm. Consequently, in an ideal example the contact lens would reduce the level of harmful high energy blue light (415-455 nm) passing through the contact lens whilst allowing the blue light (465-495 nm) to pass that is beneficial for non-visual functions.

The blue light blocking can be accomplished by the addition of a colourant, typically a yellow-coloured pigment or dye, which absorbs in the blue region of the spectrum. Such dyes are mentioned in, for example, U.S. Pat. No. 5,470,932, and ideally absorb primarily blue light within the harmful 415-455 nm region of the spectrum. The addition of such a yellow colourant has been found to be effective in reducing the harmful effects of the blue light, however, the resulting contact lens is coloured by the introduced colourant, typically resulting in a noticeable yellow colouration, which may affect the users' colour perception and is not aesthetically pleasing to some users.

Contact lenses may also include handling tints, and UV-blockers. Handling tints are colourants which provide a faint colouration, typically blue, which makes it easier for a user to see and handle the contact lens. Handling tints are generally added to the formulation at a relatively low level, to produce only a faint colouration, and are therefore typically present at a lower concentration than a blue-blocking component. Hence, including a blue-blocking colourant can mask or otherwise change the colour of the handling tint.

UV-blockers are compounds which absorb UV-light, which has also been found to be harmful to the eye.

In addition, some lens colourants have been found to change colour or leach out during manufacture or storage of the lens, thereby leading to an undesirable change in the colour of the final lens. Pigments, which are insoluble colourants, have also been found to be less desirable than dyes, due to issues such as difficulty in dispersing the pigment evenly through the contact lens.

The present disclosure seeks to mitigate the above-mentioned problems. Alternatively, or additionally, the present disclosure seeks to provide an improved contact lens.

SUMMARY

The present disclosure provides, according to a first aspect, a contact lens comprising a polymeric matrix formed from the polymerization of a polymerizable composition comprising one or more monomers, a first colourant which is a blue-blocking colourant having an absorption maximum ($\lambda_{max}$) in the range of from 415 nm to 455 nm and a second colourant, wherein the second colourant is a polymerizable dye having an absorption maximum ($\lambda_{max}$) in the range of from 470 nm to 600 nm, and optionally also comprising a third colourant which is a colourant having an absorption maximum in the range of from greater than 600 nm to 800 nm.

The second colourant and, if present, the third colourant, balance the colour of the first colourant such that the contact lens is colourless, grey or blue.

Typically, the first colourant is yellow, the second colourant is red or violet and the third colourant is blue.

In a favoured aspect, the present disclosure provides a contact lens comprising a polymeric matrix formed from the polymerization of a polymerizable composition comprising one or more monomers, a first colourant which is a blue-blocking yellow colourant having an absorption maximum ($\lambda_{max}$) in the range of from 415 nm to 455 nm and a second colourant, wherein the second colourant is a polymerizable violet or red dye having an absorption maximum ($\lambda_{max}$) in the range of from 470 nm to 600 nm, and optionally also comprising a third colourant which is a blue colourant having an absorption maximum in the range of from greater than 600 nm to 800 nm, wherein the second colourant and, if present, the third colourant, balance the yellow colour of the first colourant such that the contact lens is colourless, grey or blue.

The second colourant, which absorbs at longer wavelengths than the blue-blocking colourant, at least partially balances the yellow colouration of that blue-blocking colourant and therefore shifts the overall colour of the lens towards colourless or grey. The second colourant is polymerizable and is present as part of the polymeric matrix of the contact lens and so it cannot leach out of the lens during autoclaving or storage.

According to a further aspect of the disclosure there is also provided a contact lens comprising a polymeric matrix, a first colourant which is a blue-blocking colourant having an absorption maximum ($\lambda_{max}$) in the range of from 415 nm to 455 nm and a second colourant, wherein the second colourant is a polymerizable anthraquinone dye having an absorption maximum ($\lambda_{max}$) in the range of from 470 nm to 600 nm as described herein.

According to a further aspect of the disclosure there is also provided a method of making a contact lens comprising the step of polymerizing a polymerizable composition comprising one or more monomers, a first colourant which is a blue-blocking colourant having an absorption maximum ($\lambda_{max}$) in the range of from 415 nm to 455 nm and a second colourant, wherein the second colourant is a polymerizable dye having an absorption maximum ($\lambda_{max}$) in the range of from 470 nm to 600 nm, and optionally also comprising a third colourant which is a colourant having an absorption maximum in the range of from greater than 600 nm to 800 nm, in a mould to form a lens-shaped polymerization product comprising a polymeric matrix, wherein the second colourant and, if present, the third colourant, balance the colour of the first colourant such that the contact lens is colourless, grey or blue.

According to a favoured aspect, the present disclosure provides a method of making a contact lens comprising the steps of polymerizing a polymerizable composition comprising one or more monomers, a first colourant which is a blue-blocking yellow colourant having an absorption maximum ($\lambda_{max}$) in the range of from 415 nm to 455 nm and a second colourant, wherein the second colourant is a polymerizable violet or red dye having an absorption maximum ($\lambda_{max}$) in the range of from 470 nm to 600 nm, and optionally also comprising a third colourant which is a blue colourant having an absorption maximum in the range of from greater than 600 nm to 800 nm, in a mould to form a lens-shaped polymerization product comprising a polymeric matrix, wherein the second colourant and, if present, the third colourant, balance the yellow colour of the first colourant such that the contact lens is colourless, grey or blue.

According to a further aspect of the disclosure there is also provided a packaged contact lens comprising a sealed package containing a packaging solution and a contact lens as described herein or as made by a method as described herein.

Optional but preferred features are set out in the dependent claims.

It will of course be appreciated that features described in relation to one aspect of the present disclosure may be incorporated into other aspects of the present disclosure. For example, the method of the disclosure may incorporate any of the features described with reference to the contact lens of the disclosure and vice versa.

DESCRIPTION OF THE FIGURES

Embodiments of the present disclosure will now be described by way of example only with reference to the accompanying Figures.

DETAILED DESCRIPTION

Figure 1:
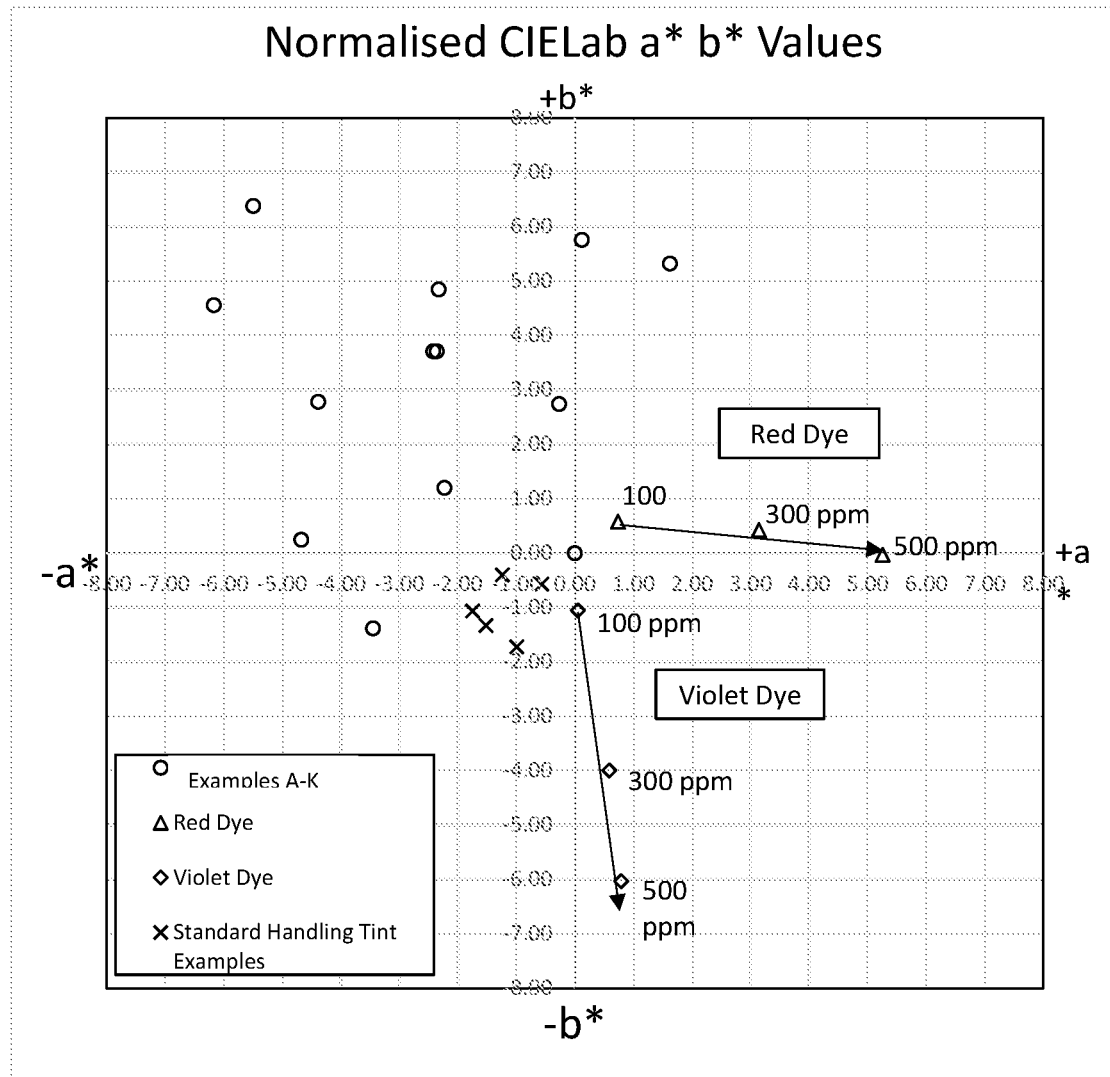
FIG. 1 is a plot of the a* and b* values from the CIELab L*a*b* colour measurement results of various contact lenses.

The present disclosure will be more fully understood and further advantages will become apparent when reference is made to the following detailed description of embodiments of the present disclosure.

The present disclosure is based on the discovery that it is possible to effectively balance the undesirable yellow colouration of a lens having a blue-blocking colourant by including a second colourant which absorbs at a longer wavelength, typically, a red dye or a violet dye, which is soluble in the contact lens formulation and is polymerizable so that it forms part of the polymeric matrix of the lens and is retained in the lens during autoclaving and storage. Optionally, a third colorant is also included in the contact lens to help give the desired colour.

As used herein, the term "lens" means an ophthalmic lens that can be placed on the eye of a person. The term "contact lens" is commonly used in the art to encompass such lenses.

It will be appreciated that such a contact lens will provide clinically acceptable on-eye movement and not bind to the eye or eyes of a person. The contact lens can be in the form of a corneal lens (e.g. a lens that rests on the cornea of the eye).

Percentages and ppm values as used herein should be understood to be by weight. Percentages and ppm values referring to the contact lens should be understood as being on a dry basis, unless the context requires a different meaning. The term "on a dry basis" and similar terms should be understood to refer to the weight of the dry contact lens, that is, excluding any water or other solvent or diluent present.

As used herein, the term "an absorption maximum" and "$\lambda_{max}$" in relation to a colourant have the same meaning and refer to the wavelength at which the colourant has the strongest absorbance measured by UV-vis absorption spectrometry in methanol solution.

As used herein, the terms "first colourant", "second colourant" and "third colourant" should be understood as being labels which refer to colourants having absorption maximum ($\lambda_{max}$) in the specified ranges. They should not be taken to imply a limitation on the number of such colourants present in the contact lens or polymerizable composition and hence it is within the scope of the invention for the contact lens to comprise one or more first colourants, one or more second colourants and optionally one or more third colourants. Thus, for example, the second colourant could in practice be a mixture of two or more polymerizable dyes each having an absorption maximum ($\lambda_{max}$) in the range of from 470 nm to 600 nm. References herein to the concentration of a colourant should be understood as being the total concentration of all colourants of that type.

It will therefore be understood that the invention provides a contact lens comprising a polymeric matrix formed from the polymerization of a polymerizable composition comprising one or more monomers, one or more first colourants, each of which is a blue-blocking colourant having an absorption maximum ($\lambda_{max}$) in the range of from 415 nm to 455 nm and one or more second colourants, wherein the or each second colourant is a polymerizable dye having an absorption maximum ($\lambda_{max}$) in the range of from 470 nm to 600 nm, and optionally also comprising one or more third colourants, each of which is a colourant having an absorption maximum in the range of from greater than 600 nm to 800 nm, wherein the second colourant(s) and, if present, the third colourant(s), balance the colour of the first colourant(s) such that the contact lens is colourless, grey or blue. It will also be understood that the invention also provides a method of making a contact lens comprising the steps of polymerizing a polymerizable composition comprising one or more monomers, one or more first colourants, each of which is a blue-blocking colourant having an absorption maximum ($\lambda_{max}$) in the range of from 415 nm to 455 nm and one or more second colourants, wherein the or each second colourant is a polymerizable dye having an absorption maximum ($\lambda_{max}$) in the range of from 470 nm to 600 nm, and optionally also comprising one or more third colourants, each of which is a colourant having an absorption maximum in the range of from greater than 600 nm to 800 nm, in a mould to form a lens-shaped polymerization product comprising a polymeric matrix, wherein the second colourant(s) and, if present, the third colourant(s), balance the colour of the first colourant(s) such that the contact lens is colourless, grey or blue.

Optionally, there is only a single first colourant, only a single second colourant and, if a third colourant is present, only a single third colourant.

The First Colourant

The first colourant is a blue-blocking pigment or dye, that is, it absorbs at least a portion of the blue light which passes through the contact lens, especially blue light having wavelengths of from 415 to 455 nm. The first colourant is preferably a dye. The first colourant will typically be a yellow colourant, preferably a yellow dye. The first colourant will have an absorption maximum ($\lambda_{max}$) in the range of from 415 nm to 455 nm, optionally in the range of from 415 nm to 445 nm.

The first colourant may be of any suitable type, for example the first colourant may be a dye such as an anthraquinone or azo dye, optionally including one or more polymerizable groups such as acrylate, methacrylate, vinyl, allyl, methacrylamide and acrylamide.

The person skilled in the art is aware of various suitable blue-blocking dyes for use in contact lenses. The first colourant may be polymerizable or non-polymerizable. For example, blue-blocking dyes having a yellow colour and comprising polymerizable groups such as acrylate and methacrylate are described in U.S. Pat. No. 5,470,932. Further yellow dyes suitable for use as blue-blocking dyes include Disperse Orange 3 Methacrylamide (2-methyl-N-{4-[(Z)-(4-nitrophenyl)diazenyl]phenyl}prop-2-enamide; CAS Reg. No 58142-15-7), and acrylates based on Reactive Yellow 15 (4-(4,5-dihydro-4-((2-methoxy-5-methyl-4-((2-(sulfooxy) ethyl) sulfonyl)phenyl)azo)-3-methyl-5-oxo-1H-pyrazol-1-yl)-]-benzensulfonic acid; CAS Reg. No. 60958-41-0) and Reactive Yellow 86 (4-((5-aminocarbonyl-1-ethyl-1,6-dihydro-2-hydroxy-4-methyl-6-oxo-3-pyridinyl)azo)-6-(4,6-dichloro-1,3,5-triazin-2-yl)amino)-1,3-benzenedisulfonic acid-disodium salt; CAS Reg. No. 61951-86-8).

The first colourant will desirably be stable to autoclaving and storage of the contact lens in a packaging solution, thereby maintaining the colour of the contact lens unchanged through manufacture and storage of the contact lens.

If the first colourant is polymerizable it will also become polymerized into the polymeric matrix such that both the first and second dyes are covalently bonded into the polymeric matrix and they will not leach out during subsequent processing and storage of the contact lens. The first colourant is preferably a dye which is soluble in the polymerizable composition so that dissolving the dye in the polymerizable composition gives an even distribution of the dye throughout the polymerizable composition. Preferably, following polymerization, the concentration of the first colourant in the polymeric matrix per unit volume does not vary by more than plus or minus 5% from the average concentration throughout the volume of the polymeric matrix.

The concentration of the first colourant in the contact lens will be chosen based on the desired level of blue light blocking. Preferably, the transmissibility in the range 415 nm-455 nm, as measured according to BS EN ISO 18369-3-2017 section 4.8 as described below, of less than 90%, preferably less than 80%. The concentration of the first colourant in the contact lens on a dry basis is optionally in the range of from 20 ppm to 1000 ppm, optionally from 40 ppm to 1000 ppm, optionally from 100 ppm to 1000 ppm, optionally from 300 ppm to 1000 ppm, for example, from 350 ppm to 900 ppm.

The Second Colourant

The purpose of the second colourant is to at least partially balance the colour of the first colourant, which is typically yellow and may undesirably affect the vision of the wearer of the contact lens. The term "colour balancing" is to be understood to mean countering the yellow colour of the first colourant. The colour balancing colourant (ie the second colourant) is used in an appropriate concentration to bring the overall colour of the contact lens closer to colourless, grey or blue.

The second colourant has an absorption maximum ($\lambda_{max}$) in the range of from 470 nm to 600 nm, optionally from 470 nm to 599 nm, optionally from 500 nm to 590 nm. Typically, the second colourant is a red or violet dye, preferably a violet dye. Optionally, the second colourant is a red dye having an absorption maximum ($\lambda$max), for example, in the range of from 510 nm to 540 nm. Optionally, the second colourant is a violet dye having an absorption maximum ($\lambda_{max}$), for example, in the range of from 550 nm to 570 nm. The inventors have found that where the second colourant is a violet dye, it is often possible to balance the colour of the first colourant using only the second colourant, that is, without including a third colourant. Optionally, the second colourant is violet and the contact lens is grey or colourless and does not include a third colourant as herein defined. However, if the second colourant is red, it may be necessary to include the third colourant in order to give the required degree of colour balancing. Also, in some cases it may be desirable to include a third colourant, to give the contact lens a faint blue colouration as a handling tint. Optionally, the second colourant is red and the contact lens is grey, colourless or blue and does include a third colourant as herein defined.

The second colourant is soluble in the polymerizable composition so that dissolving the second colourant in the polymerizable composition gives an even distribution of the second colourant throughout the polymerizable composition. Preferably, following polymerization, the concentration of the second colourant in the polymeric matrix per unit volume does not vary by more than plus or minus 5% from the average concentration throughout the volume of the polymeric matrix.

The second colourant may be a dye of any suitable type, for example, an azo or anthraquinone dye. The present inventors have found that anthraquinone dyes display superior colour fastness and stability during manufacture of the contact lens and on storage of the contact lens, thereby maintaining the colour of the contact lens stable. Preferably, the second colourant is an anthraquinone dye, more preferably a violet anthraquinone dye.

Preferably, the second colourant contains a chromophore and at least one polymerizable group wherein each polymerizable group is connected to the chromophore by a divalent linking group.

The chromophore may be any suitable chromophore which has an absorption maximum ($\lambda_{max}$) in the range of from 470 nm to 600 nm, optionally from 500 nm to 600 nm. Advantageously, the chromophore is an anthraquinone chromophore. The anthraquinone chromophore may be substituted by at least one electron-donating or electron-withdrawing group. Such electron-donating or electron-withdrawing groups influence the absorption spectrum of the chromophore thereby giving the desired colour. Optionally, the anthraquinone chromophore comprises from 1 to 3 substituents selected from —F, —Cl, —Br, —I, —OR$^2$, —SR$^2$, —R$^2$, —NO$_2$, —CN, —NCO, —NCS, —C(=O)R$^2$, —C(=O)OR$^2$, —NR$^2{}_2$, —C(=O)NHR$^2$, —C(=O)N(R$^2$)$_2$, where each R$^2$ is independently H or C1 to C20 hydrocarbyl, preferably straight- or branched-chain alkyl.

Optionally, the second colourant is a dye which comprises from 1 to 3, more preferably 1 or 2, and most preferably 2 polymerizable groups. The polymerizable group or groups are optionally each independently selected from acrylate, methacrylate, acrylamide, methacrylamide, allyl and vinyl. Preferably, the polymerizable groups are acrylate or methacrylate.

Each of the polymerizable groups is connected to the chromophore via a linking group.

Each linking group optionally comprises from 2 to 50 atoms selected from C, H, O, Si, N, P, S, F, Cl, Br and I. The linking groups are divalent radicals. Each linking group may comprise a divalent C1 to C50, optionally C1 to C20, divalent hydrocarbylene group which may be substituted or unsubstituted by one or more heteroatoms, optionally selected from O, S, N, P, Si, F, Cl, Br and I. Optionally, each linking group are optionally connected to the chromophore, which is preferably anthraquinone, via an oxygen, sulphur or nitrogen atom (for the purposes of the present disclosure that oxygen, sulphur or nitrogen atom is considered to be part of the linking group).

Where the chromophore is anthraquinone, the second colourant preferably comprises from 1 to 3 polymerizable groups, more preferably 1 or 2 polymerizable groups. In the case where two polymerizable groups are present, the linking groups are preferably attached to the anthraquinone at the 1,2-positions, the 1,3-positions, the 1,4-positions, the 1,5-positions, the 2,6-positions, the 2,7-positions, the 1,8-positions or the 2,8-positions, and are more preferably attached at the 1,2-positions, the 1,3-positions, the 1,4-positions or the 1,5-positions of the anthraquinone. Optionally, where two polymerizable groups are present, the linking groups are preferably attached to the anthraquinone at the 1,2-positions, the 1,3-positions, the 1,4-positions, the 1,5-positions, the 2,6-positions, the 2,7-positions, the 1,8-positions or the 2,8-positions, and are more preferably attached at the 1,2-positions, the 1,3-positions or the 1,5-positions of the anthraquinone.

The second colourant is preferably of formula (1).

Ch-(L-X$_m$)$_n$           (1)

where Ch is a chromophore, L is a linking group or heteroatom, preferably a linking group, X is a polymerizable group, m is from 1 to 3 and n is from 1 to 3. Preferably m=1.

The second colourant is preferably of formula (1a).

Ch-(L-X)$_n$           (1a)

where Ch is a chromophore, L is a divalent linking group or divalent heteroatom, X is a polymerizable group, and n is from 1 to 3.

Optionally, the chromophore Ch is an anthraquinone chromophore which preferably comprises from 1 to 3 substituents independently selected from —F, —Cl, —Br, —I, —OR$^2$, —SR$^2$, —R$^2$, —NO$_2$, —CN, —NCO, —NCS, —C(=O)R$^2$, —C(=O)OR$^2$, —NH$_2$, —C(=O)NHR$^2$, —C(=O)N(R$^2$)$_2$, where each R$^2$ is independently H or C1 to C20 hydrocarbyl.

Optionally, L is a divalent linking group. Optionally, the linking group L is —N(H)—R$^1$—, —SR$^1$ or —OR$^1$, where R$^1$ is a divalent hydrocarbylene group, optionally a C1 to C50, optionally C1 to C20, divalent hydrocarbylene group, which may be substituted or unsubstituted by one or more heteroatoms, optionally selected from O, S, N, P, Si, F, Cl, Br and I. R$^1$ may, for example, comprise an aryl group, a linear or branched alkylene group or aryl-alkylene group optionally comprising one or more heteroatoms selected from F, Cl, Br, I, O, N, P and S. Optionally, R$^1$ is -(1,4-Ph)-(CH$_2$)$_e$— where e=1 to 16. Optionally, R$^1$=-(1,4-Ph)-CH$_2$—CH$_2$—.

Optionally, the linking group L comprises a C6 to C14 aryl group, a C1 to C20 alkyl group, or a C7 to C20 aryl-alkyl group.

Optionally, each polymerizable group X is independently selected from acrylate, methacrylate, acrylamide, methacrylamide, allyl and vinyl. Preferably, the polymerizable group(s) X are each acrylate or methacrylate.

Optionally, the or each -L-X substituent is according to formula (1c) or formula (1d) below.

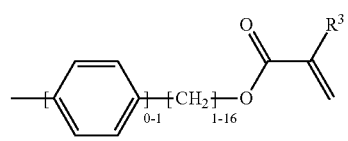

(1c)

Where R$^3$ is —H or —CH$_3$.

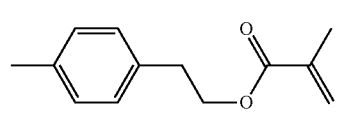

(1d)

Optionally, each polymerizable group X is independently selected from acrylate, methacrylate, acrylamide, methacrylamide, allyl and vinyl. Preferably, the polymerizable group(s) X are each acrylate or methacrylate.

Optionally, the second colourant is according to formula (2)

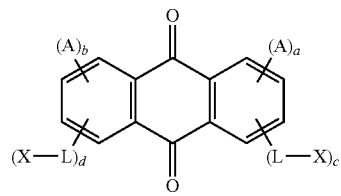

(2)

where a and b can each be from 0 to 3 provided that 0≤(a+b)≤3; each A is independently selected from —F, —Cl, —Br, —I, —OR$^2$, —SR$^2$, —R$^2$, —NO$_2$, —CN, —NCO, —NCS, —C(=O)R$^2$, —C(=O)OR$^2$, —NR$^2$$_2$, —C(=O)NHR$^2$, —C(=O)N(R$^2$)$_2$, where each R$^2$ is as defined above; c and d can each be from 0 to 3 provided that 1≤(c+d)≤3; and L and X are as defined above. Optionally, the anthraquinone does not have -L-X groups at both the 1 and 4 positions. Optionally, in the case where (a+b)=0, (c+d)=2, and L=—NHR$^a$—, where —R$^a$— is a divalent radical with 1 to 12 carbon atoms, the (L-X) groups are not in the 1,4-positions.

Optionally, the second colourant is according to formula (3) or formula (4):

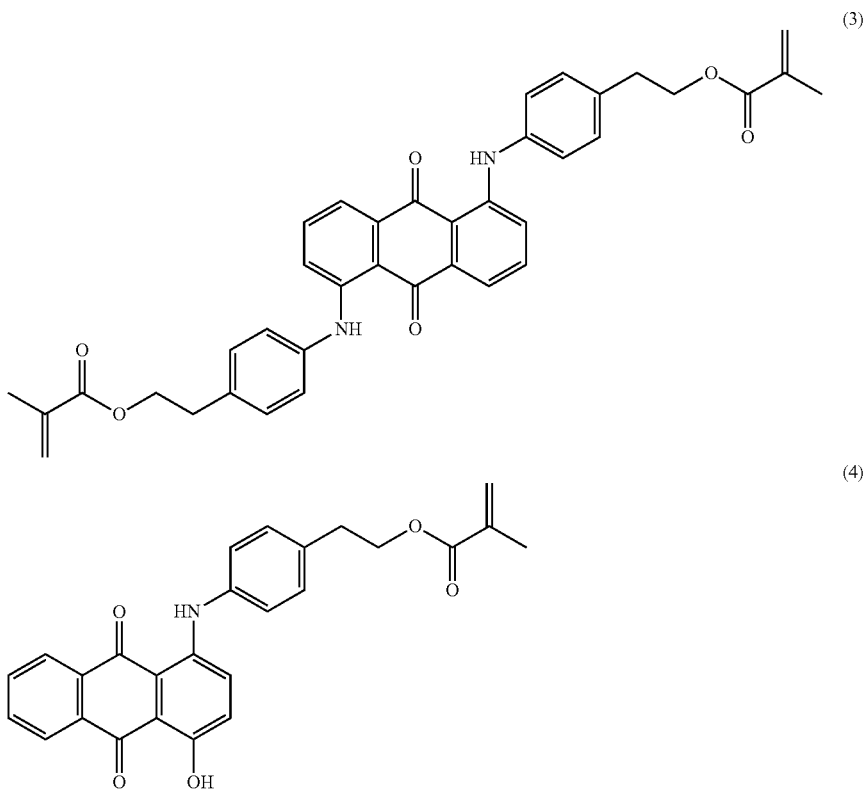

(3)

(4)

Optionally, the second colourant is one of Compounds 1 to 7 set forth in the Prophetic Examples below.

The concentration of the second colourant in the contact lens will be selected based on the colour intensity needed to balance the colour of the first colourant. The concentration of the second colourant in the contact lens on a dry basis is optionally in the range of from 20 ppm to 1000 ppm, optionally from 40 ppm to 1000 ppm, optionally from 100 ppm to 1000 ppm, optionally from 300 ppm to 1000 ppm, for example, from 350 ppm to 900 ppm.

The Third Colourant

Optionally, the contact lens comprises a third colourant which is a colourant having an absorption maximum ($\lambda_{max}$) in the range of from greater than 600 nm to 800 nm, optionally from 610 nm to 780 nm. The absorption maximum of the third colourant is at a higher wavelength than the absorption maximum of the second colourant. The third colourant may be a pigment or a dye. Typically, the third colourant is blue. Preferably, the third colourant is a blue dye. The third colourant may be a handling tint. Such handling tints are well known to the person skilled in the art. The third colourant may be a polymerizable blue dye. Polymerizable dyes suitable for use as handling tints are disclosed in, for example, U.S. Pat. No. 5,055,602. The third colourant is optionally an anthraquinone dye, preferably a polymerizable anthraquinone dye such as RB246: 1,4-Bis (4-(2-methacryloxyethyl)phenylamino)anthraquinone (CAS number 121888-69-5).

The third colourant is included in the polymerizable composition prior to polymerization. The third colourant is preferably soluble in the polymerizable composition and is evenly distributed throughout the polymerizable composition and the final contact lens. The concentration of the third colourant in the contact lens on a dry basis is optionally in the range of from 20 ppm to 1000 ppm, optionally from 20 ppm to 800 ppm, for example, from 40 ppm to 300 ppm.

UV-Absorbing Compound

The contact lens optionally also includes at least one compound which absorbs UV light. Such UV-absorbing compounds also known as UV-blocking compounds and are well known to the skilled person. They are typically added to contact lens formulations in order to protect the eye from the harmful effects of UV light. UV-absorbing compounds are typically colourless, and are therefore not considered to be a first, second or third colourant according to the present disclosure.

The concentration of the UV-absorbing compound in the contact lens is optionally in the range of from 0.5 wt % to 2.0 wt %, optionally from 0.7 wt % to 1.5 wt %.

If present, the at least one UV-blocking compound is preferably included in the polymerizable composition prior to polymerization. The at least one UV-blocking compound is preferably soluble in the polymerizable composition and is evenly distributed throughout the polymerizable composition and the final contact lens.

The Polymeric Matrix

Contact lenses are typically formed by polymerization of a polymerizable composition comprising one or more monomers to make polymeric matrix having the desired properties. The polymeric matrix may be formed, for example, by a method in which the polymerizable composition is dispensed into a mould of desired shape which is then closed prior to the polymerization. Upon polymerization the polymeric matrix forms in the desired shape and is then subject to processing steps such as washing, packaging and autoclaving.

The second colourant is a polymerizable dye and during the polymerization will become an integral part of the polymeric matrix. The polymeric matrix therefore includes side chains derived from the second colourant. Those side chains may be of the form -L-Ch, where L is a linking group as defined above and Ch is a chromophore as defined above.

Similarly, if the first and/or third colourant is are also polymerizable dyes then the first and/or third colourant will also become an integral part of the polymeric matrix. The first and/or third colourant will therefore in that case also give rise to corresponding side chains in the polymeric matrix.

The polymeric matrix forms the material of the contact lens. The polymeric matrix may be of any type suitable for use in a contact lens and the polymerizable composition may therefore include any monomers suitable for use in making contact lenses. Preferably, the contact lens is a hydrogel contact lens. A hydrogel is a polymeric material that can retain water in an equilibrium state at room temperature and having an equilibrium water content of at least 10 wt %. Optionally, the hydrogel has an equilibrium water content of no more than 95 wt %, optionally no more than 90 wt %.

Optionally, the contact lens is a conventional hydrogel material, that is, a hydrogel material which does not contain siloxanes. For example, the contact lens may be a conventional hydrogel of groups 1, 2, 3 and 4 as defined in BS EN ISO 13369 2017 part 1 section 4. Materials so defined include both ionic and non-ionic materials, and both low and high water content materials using the definitions in the referenced standard. Hydrophilic materials of these classifications typically are prepared using polymerizable compositions including at least one monomer suitable for producing an ocular device, preferably in the case of contact lenses hydroxyethyl methacrylate, N-vinyl pyrrolidone, alkyl methacrylates such as methyl methacrylate, methacrylic acid, aryl methacrylates, glyceryl methacrylate, fluorinated methacrylates, alkyl substituted acrylates or methacrylates, or combination thereof. Of course, other lens-producing monomers and additives may be also used. The hydrogel optionally has an equilibrium water content at 25° C. of at least 10 wt %, optionally at least 20 wt %. The hydrogel optionally has an equilibrium water content at 25° C. of no more than 90 wt %, optionally no more than 80 wt %.

Suitable lens materials include but are not limited to, bufilcon A, etafilcon A, methafilcon A, ocufilcon C, perfilcon A, phemfilcon A, and vifilcon A, methafilcon B, ocufilcon D, etafilcon A, lidofilcon A or B, alphafilcon A, tetrafilcon A, surfilcon A, vasurilcon A, hioxifilcon A.

The contact lens may be a silicone hydrogel contact lens. A silicone hydrogel material is typically formed by curing a polymerizable composition (i.e. a monomer mixture) comprising at least one siloxane monomer or macromer and at least one hydrophilic monomer or at least one hydrophilic polymer, or a combination thereof. As used herein, the term "monomer" refers to a molecule comprising a polymerizable carbon-carbon double bond (i.e. a polymerizable group) capable of reacting with other polymerizable group-containing molecules that are the same or different, to form a polymer or copolymer. The term monomer encompasses polymerizable pre-polymers and macromers, there being no size-constraint of the monomer unless indicated otherwise. The monomer may comprise a single polymerizable carbon-carbon double bond, or more than one polymerizable group, and thus have cross-linking functionality. A "siloxane monomer" is a molecule that contains at least one Si—O group and at least one polymerizable group. Siloxane monomers useful in contact lens compositions are well-known in the art (see, e.g., U.S. Pat. Nos. 8,658,747 and 6,867,245). (All patents and publications mentioned here and throughout are incorporated in their entirety by reference.) Siloxane macromers are siloxane monomers comprising one or more polymeric segments. In some examples, the polymerizable composition comprises a total amount of siloxane monomer of at least 10 wt. %, 20 wt. %, or 30 wt. % up to about 40 wt. %, 50 wt. %, 60 wt. %, or 70 wt. %. Unless specified otherwise, as used herein, a given weight percentage (wt. %) or ppm of a component of the polymerizable composition is relative to the total weight of all polymerizable ingredients, which for the purposes of this disclosure also include any interpenetrating polymer network (IPN) polymers (as described further below) in the polymerizable composition. The weight of the polymerizable composition contributed by components, such as diluents, that do not incorporate into the final contact lens product are not included in the wt. % or ppm calculation.

Optionally, the polymerizable composition comprises a hydrophilic vinyl monomer. As used-herein, a "hydrophilic vinyl monomer" is any siloxane-free (i.e. contains no Si—O groups) hydrophilic monomer having a polymerizable vinyl group present in its molecular structure. As used herein, the term "acryl group" refers to the polymerizable group present in acrylate, methacrylates, acrylamides, methacrylamides etc. Thus, while carbon-carbon double bonds are present in acrylate and methacrylate groups, as used herein, such polymerizable groups are not considered to be vinyl groups. Further, as used herein, a monomer is "hydrophilic" if at least 50 grams of the monomer are fully soluble in 1 liter of water at 20° C. (i.e., ~5% soluble in water) as determined visibly using a standard shake flask method. In various examples, the hydrophilic vinyl monomer is N-vinyl-N-methylacetamide (VMA), or N-vinyl pyrrolidone (NVP), or any combination thereof. In one example, the polymerizable composition comprises at least 10 wt. %, 15 wt. %, 20 wt. %, or 25 wt. % up to about 45 wt. %, 60 wt. %, or 75 wt. % of a hydrophilic vinyl monomer. As used herein, a given weight percentage of a particular class of component (e.g., hydrophilic vinyl monomer, siloxane monomer, or the like) in the polymerizable composition equals the sum of the wt. % of each ingredient in the composition that falls within the class. Thus, for example, a polymerizable composition that comprises 5 wt. % VMA and 25 wt. % NVP and no other hydrophilic vinyl monomer, is said to comprise 30 wt. % hydrophilic vinyl monomer. In a further specific example, the polymerizable composition comprises from about 25 wt. % up to about 75 wt. % of VMA or NVP, or a combination thereof.

Additional examples of suitable hydrophilic monomers are N,N-dimethylacrylamide (DMA), 2-hydroxyethyl methacrylate (HEMA), ethoxyethyl methacrylamide (EOEMA), ethylene glycol methyl ether methacrylate (EGMA), hydroxyl substituted C1-6 alkyl acrylates and methacrylates, for example 2-hydroxy ethyl methacrylate, (meth)acrylamide, (C1-6 alkyl)acrylamides and -methacrylamides, ethoxylated acrylates and methacrylates, hydroxyl substituted (C1-6 alkyl) acrylamides and -methacrylamides, hydroxyl-substituted C1-6 alkyl vinyl ethers, sodium vinylsulfonate, sodium styrenesulfonate, vinyl containing monomers for example N-vinylpyrrole, 2-vinyloxazoline, 2-vinyl-4,4'-dialkyloxazolin-5-one, 2- and 4-vinylpyridine, vinylically unsaturated carboxylic acids having a total of 3 to 5 carbon atoms, for example methacrylic acid, amino(C1-C6 alkyl)- (where the term "amino" also includes quaternary ammonium), dimethylaminoethyl methacrylate (DMAEMA), mono(C1-C6 alkylamino)(C1C6 alkyl) and di(C1-C6 alkylamino)(C1-C6 alkyl) acrylates and methacrylates, allyl alcohol, and zwitterionic monomers including sulphobetaines and carboxybetaines, and combinations thereof.

The polymerizable composition additionally may also comprise a non-silicon containing hydrophobic monomer. Examples of suitable hydrophobic co-monomers include methyl acrylate, ethyl acrylate, propyl acrylate, isopropyl acrylate, cyclohexyl acrylate, 2-ethylhexyl acrylate, methyl methacrylate, ethyl methacrylate, propylmethacrylate, butyl acrylate, 2-hydroxybutyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, tetrafluoropropyl methacrylate, hexafluorobutyl methacrylate. Further, as used herein, a monomer is "hydrophobic" if less than 50 grams of the monomer are fully soluble in 1 liter of water at 20° C. (i.e., ~5% soluble in water) as determined visibly using a standard shake flask method.

In addition, or as an alternative to a hydrophilic monomer, the polymerizable composition may comprise a non-polymerizable hydrophilic polymer, which results in a polymeric lens body comprising an interpenetrating polymer network (IPN) with the non-polymerizable hydrophilic polymer interpenetrating the silicone hydrogel polymer matrix. In this example, the non-polymerizable hydrophilic polymer is referred to as an IPN polymer, which acts as an internal wetting agent in the contact lens. In contrast, polymer chains within the silicone hydrogel network that form by polymerization of monomers present in the polymerizable composition are not considered to be IPN polymers. The IPN polymer may be a high molecular weight hydrophilic polymer, for example from about 50,000 to about 500,000 Daltons. In a specific example, the IPN polymer is polyvinylpyrrolidone (PVP). In other examples, the polymerizable composition is substantially free of polyvinyl pyrrolidone or other IPN polymer.

The polymerizable composition may additionally comprise at least one cross-linking agent. As used herein, a "cross-linking agent" is a molecule having at least two polymerizable groups. Thus, a cross-linking agent can react with functional groups on two or more polymer chains so as to bridge one polymer to another. The cross-linking agent may comprise an acryl group or a vinyl group, or both an acryl group and a vinyl group. In certain examples, the cross-linking agent is free of siloxane moieties, i.e., it is a non-siloxane cross-linking agent. A variety of cross-linking agents suitable for use in silicone hydrogel polymerizable compositions are known in the field (see, e.g., U.S. Pat. No. 8,231,218, incorporated herein by reference). Examples of suitable cross-linking agents include, without limitation, lower alkylene glycol di(meth)acrylates such as triethylene glycol dimethacrylate and diethylene glycol dimethacrylate; poly(lower alkylene) glycol di(meth)acrylates; lower alkylene di(meth)acrylates; allyl methacrylate, divinyl ethers such as triethyleneglycol divinyl ether, diethyleneglycol divinyl ether, 1,4-butanediol divinyl ether and 1,4-cyclohexanedimethanol divinyl ether; divinyl sulfone; di- and trivinylbenzene; trimethylolpropane tri(meth)acrylate; pentaerythritol tetra(meth)acrylate; bisphenol A di(meth) acrylate; methylenebis(meth)acrylamide; triallyl phthalate; 1,3-Bis(3-methacryloxypropyl)tetramethyldisiloxane; diallyl phthalate; triallyl isocyanurate and combinations thereof.

As will be appreciated by those skilled in the art, the polymerizable composition may comprise additional polymerizable or non-polymerizable ingredients conventionally used in contact lens formulations such as one or more of a polymerization initiator, an oxygen scavenger, a chain transfer agent, a diluent, or the like. In some examples, the polymerizable composition may include an organic diluent in an amount to prevent or minimize phase separation between the hydrophilic and hydrophobic components of the polymerizable composition, so that an optically clear lens is obtained. Diluents commonly used in contact lens formulations include hexanol, ethanol, and/or other primary, secondary or tertiary alcohols. In other examples, the polymerizable composition is free or substantially free (e.g., less than 500 ppm) of an organic diluent. In such examples, the use of siloxane monomers containing hydrophilic moieties such as polyethylene oxide groups, pendant hydroxyl groups, or other hydrophilic groups, may make it unnecessary to include a diluent in the polymerizable composition. Non-limiting examples of these and additional ingredients that may be included in the polymerizable composition are provided in U.S. Pat. No. 8,231,218.

Non-limiting examples of silicone hydrogels that may be used include comfilcon A, fanfilcon A, stenfilcon A, senofilcon A, senofilcon C. somofilcon A, narafilcon A, delefilcon A, narafilcon B, lotrafilcon A, lotrafilcon B, balafilcon A, samfilcon A, galyfilcon A, asmofilcon A, riofilcon A, kalifilcon A, olifilcon A, senofilcon B, and enfilcon A.

In a specific embodiment, the polymerizable composition comprises from 25 wt. % to 55 wt. % of one or more siloxane monomers, from 30 wt. % to 55 wt. % of a vinyl monomer selected from NVP and VMA, and combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), and ethylene glycol methyl ether methacrylate (EGMA), and combinations thereof, and optionally from about 1 wt. % to about 20 wt. % of a hydrophobic monomer selected from methyl methacrylate (MMA), isobornyl methacrylate (IBM), and 2-hydroxybutyl methacryate (HOB). Silicone hydrogel materials made from this specific embodiment of polymerizable composition include stenfilcon A, comfilcon A, somofilcon A, fanfilcon A, and enfilcon A.

As stated, in preferred embodiments, the contact lens of the present invention can be considered a soft contact lens, and particularly a soft silicone hydrogel contact lens.

The contact lens may be of any lens wear modality. Lens wear modality refers to how many days and nights in a row the lens can be worn without removal. In one example, the contact lens is a daily disposable lens. Daily disposable lenses are indicated for single use, up to about 12 or 16 hours of continuous wear and should be discarded after the single use. In another example, the contact lens is a daily wear lens. Daily wear lenses are worn during the waking hours, typically up to about 12 to 16 hours, and are removed before sleep. Daily wear lenses are typically stored in a contact lens case containing a contact lens care solution for cleaning and disinfecting the lens during the hours of non-use. Daily wear lenses are typically discarded after a maximum of 30 days wear. In yet another example, the contact lens is an extended wear lens. Extended wear lenses are typically worn continuously for up to 6, 14 or 30 consecutive days and nights.

As part of the present invention, the contact lens can be sealed in a contact lens package. The packaging solution sealed within the contact lens package may be any conventional contact-lens compatible solution. In one example, the packaging solution comprises, consists, or consists essentially, of an aqueous solution of a buffer, and/or a tonicity agent. In another example, the packaging solution contains additional agents such as one or more additional antimicrobial agents, and/or a comfort agent, and/or a hydrophilic polymer, and/or a surfactant and/or other beneficial agent. In some examples, the packaging solution may comprise polysaccharides (e.g. hyaluronic acid, hydroxypropyl methylcellulose, hydroxypropyl cellulose, hydroxyethyl cellulose, etc.) or other high molecular weight polymers, such as polyvinyl pyrrolidone, which are commonly used as comfort polymers or thickening agents in ophthalmic solutions and contact lens packaging solutions. In other examples, the packaging solution may comprise an ophthalmic drug. The packaging solution can have a pH in the range of about 6.8 or 7.0 up to about 7.8 or 8.0. In one example, the packaging solution comprises phosphate buffer or borate buffer. In another example, the packaging solution comprises a tonicity agent selected from sodium chloride or sorbitol in an amount to maintain osmolality in the range of about 200 to 400 mOsm/kg, and typically from about 270 mOsm/kg up to about 310 mOsm/kg.

With respect to the contact lens package, this package can include or comprise a plastic base member comprising a cavity configured to retain the contact lens and packaging solution and a flange region extending outwardly around the cavity. A removable foil is attached to the flange region to provide a sealed contact lens package. Such contact lens packages, which are commonly referred to as "blister packs", are well-known in the art (see e.g. U.S. Pat. No. 7,426,993). The package can also comprise of two foil members bonded together, which may either be flat, or one or both foil members formed into an appropriate geometric shape to accommodate the lens and packaging solution.

It will be appreciated that conventional manufacturing methods can be used to manufacture the sealed contact lens package. In a method of manufacturing a contact lens package, the method can include the step of placing an unworn contact lens and a contact lens packaging solution in a receptacle, placing a cover on the receptacle, and sealing the cover on the receptacle. Generally, the receptacle is configured to receive a single contact lens and an amount of packaging solution sufficient to completely cover the contact lens, typically about 0.5-1.5 ml. The receptacle may be made from any suitable material, such as glass or plastic or foil. In one example, the receptacle comprises a plastic base member comprising a cavity configured to retain the contact lens and packaging solution and a flange region extending outwardly around the cavity, and the cover comprises a removable foil attached to the flange region to provide the sealed contact lens package. The removable foil may be sealed by any conventional means such as heat sealing or gluing. In another example, the receptacle is in the form of a plastic base member comprising a plurality of threads and the cover comprises a plastic cap member comprising a compatible set of thread for engagement with the threads of the base member thereby providing a resealable cover. It will be appreciated that other types of packaging can also be used to provide a resealable package. For example, the contact lens package may comprise a plastic cover comprising features that engage with compatible features of the receptacle to form an interference fit. The method of manufacturing the sealed contact lens package may further comprise sterilizing the unworn contact lens by autoclaving the sealed contact lens package. Autoclaving generally involves subjecting the sealed contact lens package to temperatures of at least 121° C. for at least 20 minutes. Preferably, the contact lens of the invention does not significantly change colour upon autoclaving in a sealed package containing packaging solution at 121° C. for 20 minutes.

The contact lens can be provided unworn (i.e. a new contact lens, not having been previously used by a patient), immersed in the packaging solution and sealed in a package. The package may be a blister package, glass vial, foil to foil package, or other appropriate container. The package comprises a base member having a cavity for accommodating a packaging solution and an unworn contact lens. The sealed package may be sterilized by sterilizing amounts of radiation, including heat or steam, such as by autoclaving, or by gamma radiation, e-beam radiation, ultraviolet radiation, etc.

In a specific example, the packaged contact lens is sterilized by autoclaving.

The final product can be a sterile, packaged contact lens (e.g. silicone hydrogel contact lens) having ophthalmically compatible. "Ophthalmologically compatible" refers to a material which may be in direct contact with the ocular environment without causing significant changes to the ocular environment, is toxicologically inert, and without causing user discomfort for both the period of contact and following removal. This term also refers to the properties of the lens material such that the deposition of protein, lipid or other bio-molecules intrinsic to the ocular environment is limited to a level such that the performance of the device is not compromised, and that following the period of contact the device is easily removed.

The Contact Lens

The contact lens may be of any suitable design and thickness and the skilled person is aware of many such designs.

As noted above, the contact lens may be a soft contact lens, optionally a hydrogel contact lens, for example a silicone hydrogel contact lens.

The contact lens is colourless, grey or blue. Optionally, the lens is grey or blue. Various systems based on colour spaces are known for defining colour and allow the colour of an object to be defined using a specific notation. For example, the Commission Internationale de l'Eclairage (CIE), has defined colour spaces, including CIE XYZ, CIE L*a*b*, and CIE L*C*h, for communicating and expressing colour.

One such system which is suitable for use in defining the colour of contact lenses is the CIELab L*a*b* colour space. This is a 3-dimensional representation of colour in which L* is the lightness darkness co-ordinate, and a* and b* co-ordinates define the red/green and blue/yellow colour. A related system uses the same colour space to define colour using the CIELab L*C*h* co-ordinates. This is essentially the same L (lightness) axis but C (chroma) and h (hue) are different to a* and b*. C (chroma) is the distance from the L axis and h, the Hue is defined as an angle which starts at the +a* axis and is expressed in degrees (e.g., 0° is +a*, or red, and 90° is +b, or yellow). CIELab L* a* and b* values may be converted to CIELab L* C* and h* values, and vice versa, by methods known to the person skilled in the art.

Chroma is a measure of the degree of colouration, with a zero chroma corresponding to neutral or grey shades. Optionally, the contact lens is grey wherein grey is optionally defined as having a chroma (C*) value of 5.0 or less, and a Hue (h*) value of 166 degrees or less, or greater than or equal to 275 degrees. Hue (h*) is a measure of what colour is present, for example, green, blue, etc. Optionally, the contact lens is blue wherein blue is optionally defined as having a Hue (h*) value greater than 166 degrees and less than 275 degrees. Optionally, the contact lens is grey or blue and has at least one of a) a chroma (C*) value of 5.0 or less and b) a Hue (h*) value greater than 166 degrees and less than 275 degrees.

The concentrations of the colourants will be chosen so that the fraction of visible light which is transmitted through the contact lens is not reduced to an undesirable degree, which would impede the ability of the user to see, especially in low light conditions. References herein to light transmissibility over a wavelength range shall be taken to mean transmittance as measured according to BS EN ISO 18369-3-2017 section 4.8 at 1 nm intervals over the wavelength range with the results being averaged to give a mean value. Typically, the contact lens has a transmissibility in the visible light range of in the range from 380 nm to 780 nm of at least 80%, optionally at least 90%, as measured according to BS EN ISO 18369-3-2017 section 4.8.

The Method of Making the Contact Lens

The invention provides a method of making a contact lens comprising the steps of polymerizing a polymerizable composition comprising one or more monomers, a first colourant which is a blue-blocking yellow colourant having an absorption maximum ($\lambda_{max}$) in the range of from 415 nm to 455 nm and a second colourant, wherein the second colourant is a polymerizable violet or red dye having an absorption maximum ($\lambda_{max}$) in the range of from 470 nm to 600 nm, and optionally also comprising a third colourant which is a blue colourant having an absorption maximum in the range of from greater than 600 nm to 800 nm, in a mould to form a lens-shaped polymerization product comprising a polymeric matrix, wherein the second colourant and, if present, the third colourant, balance the yellow colour of the first colourant such that the contact lens is colourless, grey or blue.

Optionally, the polymerizable composition comprises from 20 ppm to 1000 ppm, optionally from 40 ppm to 1000 ppm, optionally from 100 ppm to 1000 ppm, optionally from 300 ppm to 1000 ppm, for example, from 350 ppm to 900 ppm of the first colourant based on the total weight of all polymerizable ingredients in the polymerizable composition.

Optionally, the first colourant is also polymerizable.

Optionally, the polymerizable composition comprises in the range of from 20 ppm to 1000 ppm, optionally from 40 ppm to 1000 ppm, optionally from 100 ppm to 1000 ppm, optionally from 300 ppm to 1000 ppm, for example, from 350 ppm to 900 ppm of the second colourant based on the total weight of all polymerizable ingredients in the polymerizable composition.

Optionally, the polymerizable composition comprises in the range of from 20 ppm to 1000 ppm, optionally from 20 ppm to 800 ppm, for example, from 40 ppm to 300 ppm of the third colourant based on the total weight of all polymerizable ingredients in the polymerizable composition.

Optionally, the third colourant is also polymerizable.

Optionally, the polymerizable composition also comprises from 0.5 wt % to 2.0 wt %, optionally from 0.7 wt % to 1.5 wt % of a UV-absorbing compound based on the total weight of all polymerizable ingredients in the polymerizable composition.

The polymerizable composition may be dispensed into a contact lens mould and cured (i.e. polymerized) using any suitable curing method. Typically, the polymerizable composition is exposed to polymerizing amounts of heat or ultraviolet light (UV). In the case of UV-curing, also referred to as photopolymerization, the polymerizable composition typically comprises a photoinitiator such as benzoin methyl ether, 1-hydroxycyclohexylphenyl ketone, DAROCUR, or IRGACUR (available from Ciba Specialty Chemicals). Photopolymerization methods for contact lenses are described in, e.g., U.S. Pat. No. 5,760,100. In the case of heat-curing, also referred to as thermal curing, the polymerizable composition typically comprises a thermal initiator. Exemplary thermal initiators or catalysts which are well understood in the art include azo or peroxide containing compounds such as 2,2'-azobis(2,4-dimethylpentanenitrile) (VAZO-52), 2,2'-Azobis(2-methylpropanenitrile) (VAZO-64), and 1,1'-azo bis(cyanocyclohexane) (VAZO-88), benzoyl peroxide, lauroyl peroxide, di-isopropyl-peroxy dicarbonate, azo bis (2,4-dimethyl valeronitrile), azo bis (isobutyronitrile), redox systems, for example ammonium persulphate, and photoinitiators which are effective in either the UV spectrum or the visible light spectrum or a combination of these, including for example benzoin methyl ether or phosphine oxides, for example biphenyl(2,4-trimethylbenzoyl)phosphine oxide. Preferably the cure is conducted thermally in an atmosphere containing less than 150 ppm of oxygen and more preferably less than 100 ppm of oxygen. More preferably the cure is conducted thermally in an inert atmosphere such as nitrogen or noble gas containing less than 50 ppm of oxygen. Thermal polymerization methods for contact lenses are described in, e.g., U.S. Pat. Nos. 8,231,218 and 7,854,866, which are incorporated herein by reference.

After polymerization, the resulting lens-shaped polymerization product is removed from the mould (delensed) and washed to extract any unreacted or partially reacted ingredients and to hydrate the lens. The washing step involves contacting the polymeric lens with one or more volumes of one or more washing liquids. In some examples, a first volume of washing liquid is used to "wet" delens the lens from the mould. In other examples, the lens is "dry-delensed" from the mould using a mechanical method. The method of the invention preferably comprises the step of hydrating the lens-shaped polymerization product to form a hydrogel contact lens. In some examples, the washing liquid used to wash and hydrate the lens may comprise one or more volatile organic solvents (e.g., methanol, ethanol, mixtures of lower alcohols such as industrial methylated spirits, chloroform, or the like). In other examples, the lens is washed and hydrated using only washing liquids that are free of volatile organic solvents, such as deionized water.

After the polymerization step or washing step, the polymeric lens may be subjected to a surface modification treatment to increase the wettability of the contact lens. A variety of surface modification methods for increasing the wettability of contact lens surfaces are known in the art. Examples include plasma treatment, attachment of hydrophilic polymers onto the polymeric lens such as by a layer-by-layer technique, and addition of a hydrophilic polymer into the contact lens packaging solution. These and other methods of surface modification are known in the prior art (see e.g. U.S. Pat. Nos. 4,143,949, 7,582,327, 7,841,716).

Preferably, the method of the invention also includes the step of immersing the polymerization product or the hydrogel contact lens in a package containing a packaging solution, sealing the package, and optionally sterilizing the sealed package. For example, after washing, and any optional process step (e.g. surface modification), the hydrated polymeric lens is placed into a blister package, glass vial, or other appropriate container, all referred to herein as "packages." Typically, packaging solution is also added to the container. Suitable packaging solutions include phosphate- or borate-buffered saline together with any optional additional ingredients such as a comfort agent, a medication, a surfactant to prevent the lens from sticking to its package, or the like. The package is sealed, and the sealed polymeric lens is sterilized by radiation, heat or steam (e.g., autoclaving), gamma radiation, e-beam radiation, or the like. In some examples, the lens may be packaged under sterile conditions, making a post-packaging sterilization step unnecessary. In some examples, the polymeric lens may be dry delensed, placed directly into its final package together with packaging solution, sealed, and optionally sterilized.

Thus, the washing step may be concurrent with the packaging and sterilization steps. Preferably, the contact lens is sterilized by autoclaving.

Synthesis of Example Dyes

4-Bromophenylethyl methacrylate

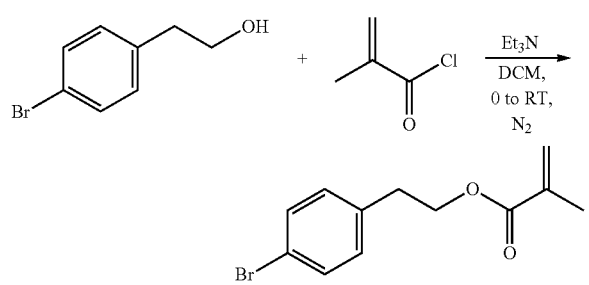

To a solution of 2-(4-bromophenyl)ethanol (25 g, 124 mmol) in dichloromethane (250 cm³) at 0° C. is slowly added triethylamine (35 cm³). Methacryloyl chloride (13 cm³, 131 mmol) is then added dropwise as to maintain the temperature below 5° C. After addition, the reaction mixture is stirred at 0-5° C. for 1 hour and then at 23° C. for 17 hours. The suspension is collected by filtration and washed with dichloromethane. The combined filtrates are washed successively with distilled water, 2N aqueous hydrochloric acid and distilled water. The organic layer is dried over anhydrous magnesium sulphate, filtered, and the solvent removed in vacuo. The crude is purified by silica plug (heptane:ethyl acetate; 9:1) to give 4-bromophenylethyl methacrylate (29.4 g, 88%) as a colourless oil. ¹H NMR (CDCl₃) 7.42-7.46 (2H, m), 7.12 (2H, d), 6.07 (1H, s), 5.54-5.57 (1H, m), 4.34 (2H, t), 2.95 (2H, t), 1.93 (3H, s).

Dye 1

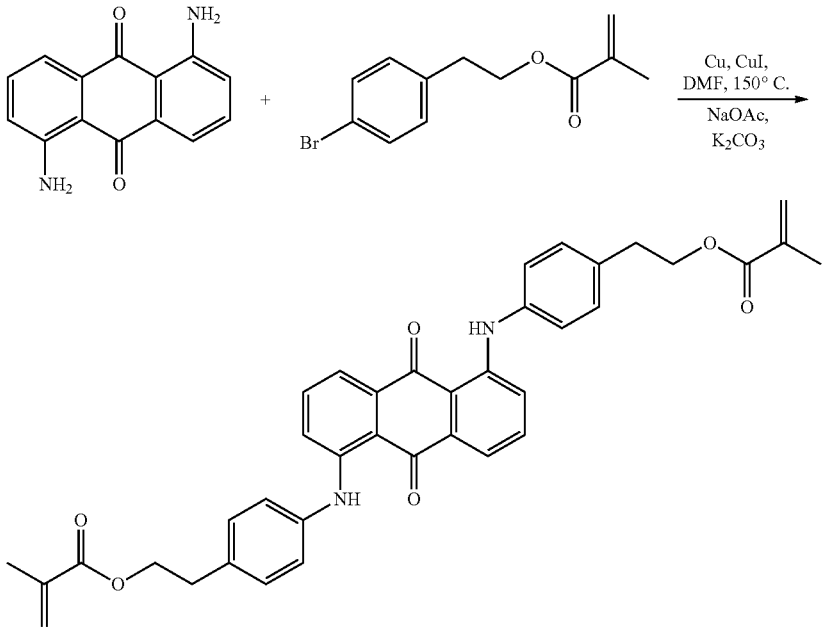

A mixture of N,N-dimethylformamide (80 cm³), 4-bromophenylethyl methacrylate (16.9 g, 63 mmol), 1,5-diaminoanthraquinone (5.0 g, 21 mmol), copper (I) iodide (800 mg, 4.2 mmol), copper (800 mg, 12.6 mmol), potassium carbonate (880 mg, 6.3 mmol) and sodium acetate (5.86 g, 71.4 mmol) is heated at 150° C. for 45 hours. The reaction is cooled down to ~100° C. and further 4-bromophenylethyl methacrylate (2.3 g, 8.6 mmol), copper (I) iodide (800 mg, 4.2 mmol) and copper (800 mg, 12.6 mmol) are added. The reaction mixture is then heated at 150° C. for a further 24 hours and then cooled down. The mixture is poured into distilled water (250 cm³) and stirred for 30 minutes before filtering. The residue is purified by repeated column chromatography (heptane:ethyl acetate; gradient from 1:0 to 9:1) followed by recrystallisation (heptane/ethyl acetate) to give dye 1 (390 mg, <1%) as a dark purple solid. ¹H NMR (CDCl₃) 11.35 (2H, s), 7.69-7.74 (2H, m), 7.42-7.53 (4H, m), 7.26-7.31 (6H, m), 6.10-6.13 (2H, m), 5.56-5.60 (2H, m), 4.39 (4H, t), 3.02 (4H, t), 1.96 (6H, s). UV-vis ($\lambda_{max}$, dichloromethane) 537 nm.

4-Iodophenylethyl methacrylate

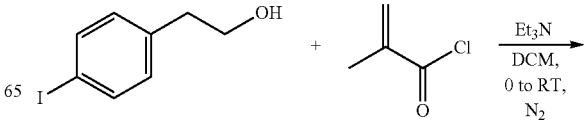

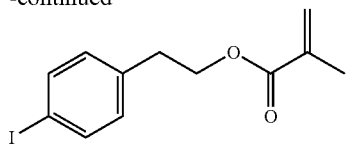

To a solution of 2-(4-iodophenyl)ethanol (20 g, 81 mmol) in dichloromethane (200 cm$^3$) at 0° C. is slowly added triethylamine (22.5 cm$^3$). Methacryloyl chloride (8.7 cm$^3$, 89 mmol) is then added dropwise as to maintain the temperature below 5° C. After addition, the reaction mixture is stirred at 0-5° C. for 1 hour and at 23° C. for 150 minutes. The solid is collected by filtration and washed with dichloromethane. The combined filtrates are washed with distilled water, 2N aqueous hydrochloric acid and distilled water. The organic layer is dried over anhydrous magnesium sulphate, filtered, and the solvent removed in vacuo. The residue is purified by silica plug (heptane:ethyl acetate; 95:5) to give 4-iodophenylethyl methacrylate (22.9 g, 90%) as a colourless oil. $^1$H NMR (CDCl$_3$) 7.61-7.67 (2H, m), 6.97-7.03 (2H, m), 6.07 (1H, s), 5.53-5.58 (1H, m), 4.33 (2H, t), 2.93 (2H, t), 1.93 (3H, s).

Dye 1 had an absorption maximum ($\lambda_{max}$) of 541 nm.

Dye 2

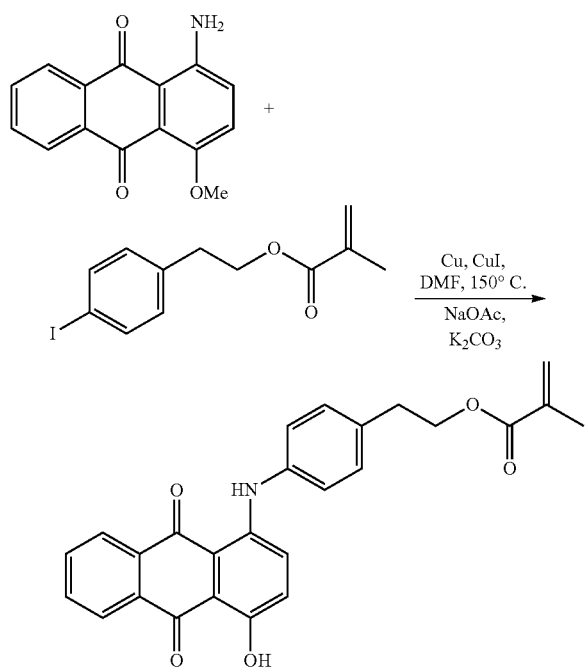

A mixture of N,N-dimethylformamide (28 cm$^3$), 4-iodophenylethyl methacrylate (5.0 g, 15.8 mmol), 1-amino-4-methoxyanthraquinone (1.9 g, 7.9 mmol), copper (I) iodide (150 mg, 0.79 mmol), copper (150 mg, 2.4 mmol), potassium carbonate (160 mg, 1.2 mmol) and sodium acetate (1.10 g, 13.4 mmol) is heated at 150° C. for 60 hours. After allowing to cool, the reaction mixture is poured into distilled water (150 cm$^3$) and the solid collected by filtration. The residue is purified by column chromatography (heptane: ethyl acetate; 9:1) to give dye 2 (300 mg, 9%) as a dark blue solid. $^1$H NMR (CDCl$_3$) 13.73 (1H, s), 11.79 (1H, s), 8.34-8.42 (2H, m), 7.80-7.87 (2H, m), 7.54-7.60 (1H, m), 7.13-7.31 (5H, m), 6.11 (1H, s), 5.58 (1H, s), 4.39 (2H, t), 3.02 (2H, t), 1.96 (3H, s). UV-vis ($\lambda_{max}$, ethanol) 570 nm.

Dye 2 had an absorption maximum ($\lambda_{max}$) of 585 nm.

Dyes 1 and 2 were used in the lens fabrication examples below.

Figure 2:
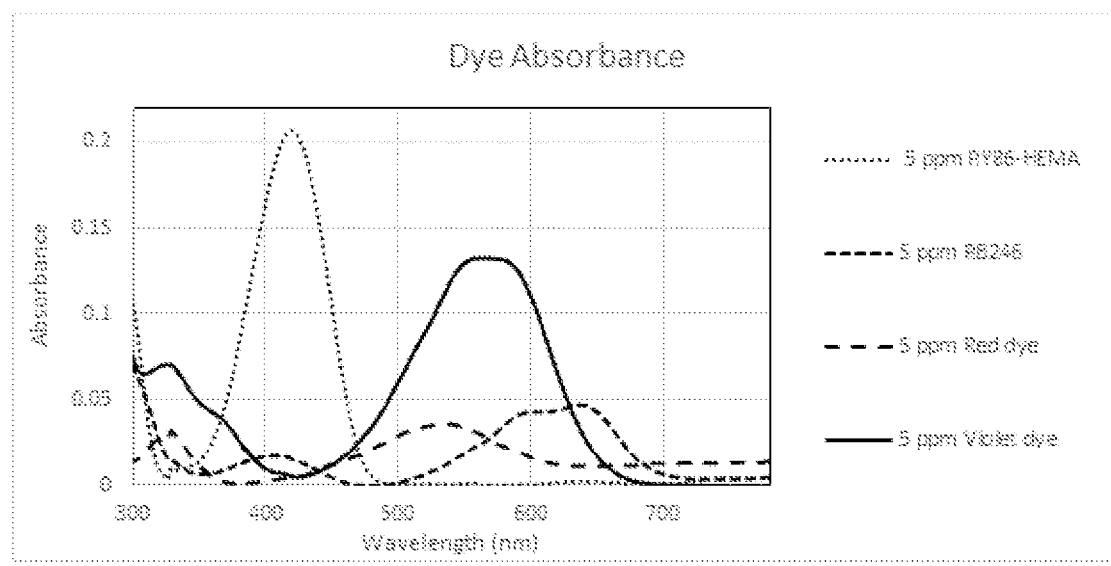
FIG. 2 shows UV-vis absorption spectra for RY86-HEMA, RB246, and the two dyes made in the dye synthesis examples below, the Red Dye (Dye 1) and the Violet Dye (Dye 2).

The UV-vis absorption spectra of the four dyes used in the contact lens examples below, Dye 1, Dye 2, RY86-HEMA and RB246, were measured using a Perkin Elmer Lambda 35 UV/Vis Spectrophotometer. A 5 ppm solution of each dye was prepared in methanol. Spectra were run in a 1 cm plastic cuvette. The baseline was autozeroed using methanol. The scan range was between 780 to 270 nm, at a data interval of 1 nm and a slit width of 1 nm. The absorbance maxima for each dye is reported in Table 1 below and the spectra are shown in FIG. 2.

TABLE 1

$\lambda_{max}$ values of four dyes

| Dye | λmax (nm) |
|---|---|
| RY-86-HEMA | 422 |
| Red Dye (Dye 1) | 531 |
| Violet Dye (Dye 2) | 560 |
| Blue Dye (RB246) | 634 |

Prophetic Dye Synthesis Examples

Intermediate 1

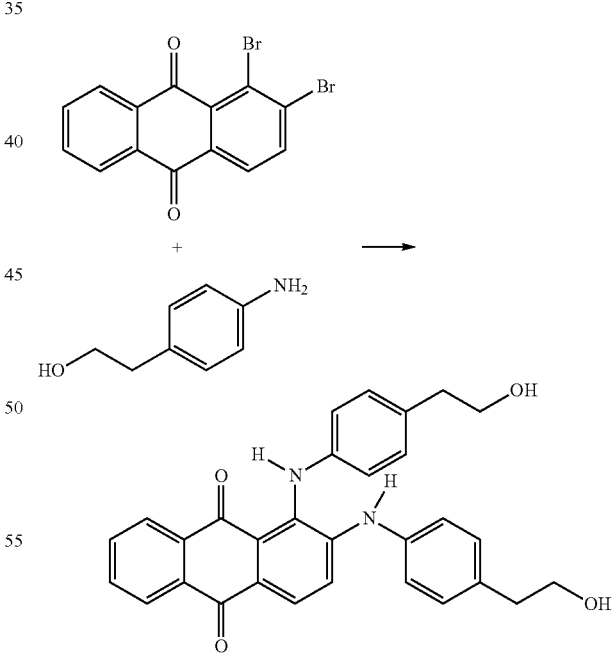

To a suspension of 1,2-dibromo-9,10-anthracenedione (5 g) and dimethyl sulfoxide (25 cm$^3$) is added 2-(4-aminophenyl)ethanol (25 g). The mixture is then heated at reflux for 4 hours, allowed to cool to 23° C. and poured into stirred water (200 cm$^3$). The solid is collected by filtration followed by recrystallisation from ethanol to give Intermediate 1.

23

Intermediate 2

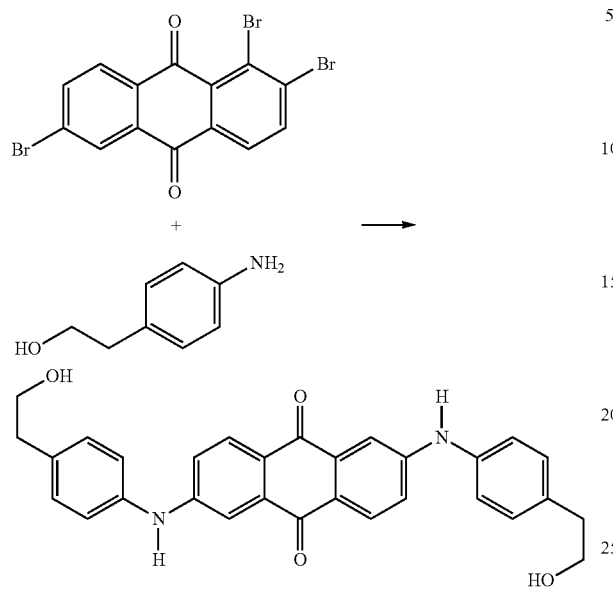

Intermediate 2 is prepared in a similar manner to Intermediate 1 except 2,6-dibromo-9,10-anthracenedione is used as the starting material.

Intermediate 3

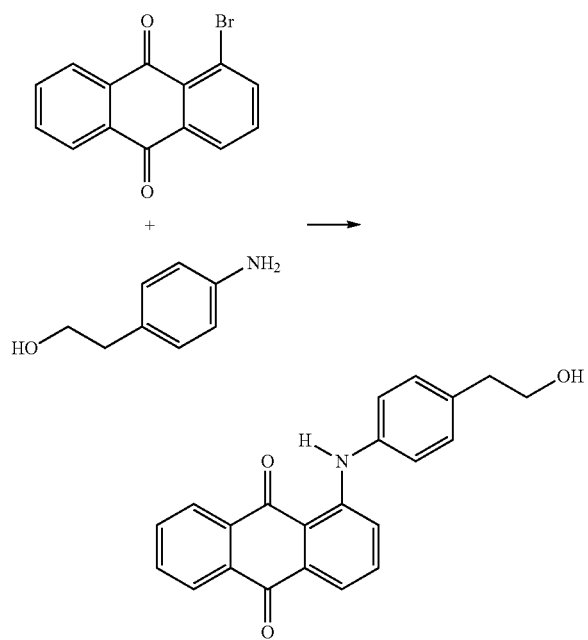

Intermediate 3 is prepared in a similar manner to Intermediate 1 except 1-bromo-9,10-anthracenedione is used as the starting material.

24

Intermediate 4

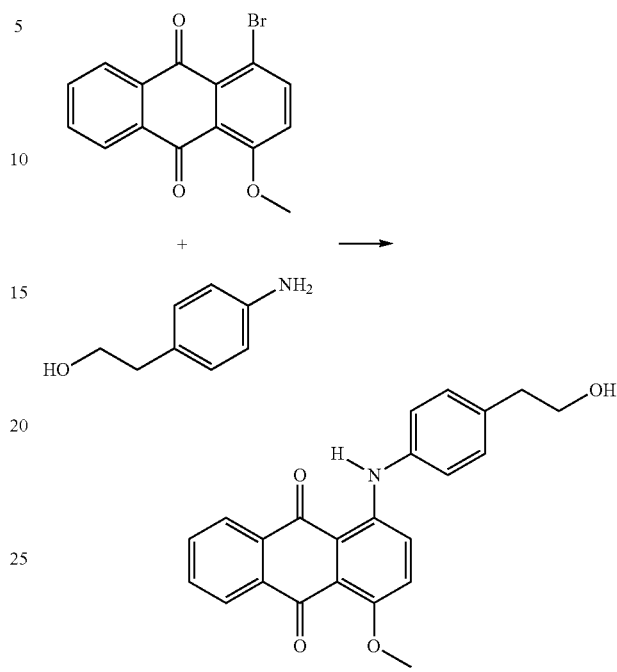

Intermediate 4 is prepared in a similar manner to Intermediate 1 except 1-bromo-4-methoxy-9,10-anthracenedione is used as the starting material.

Intermediate 5

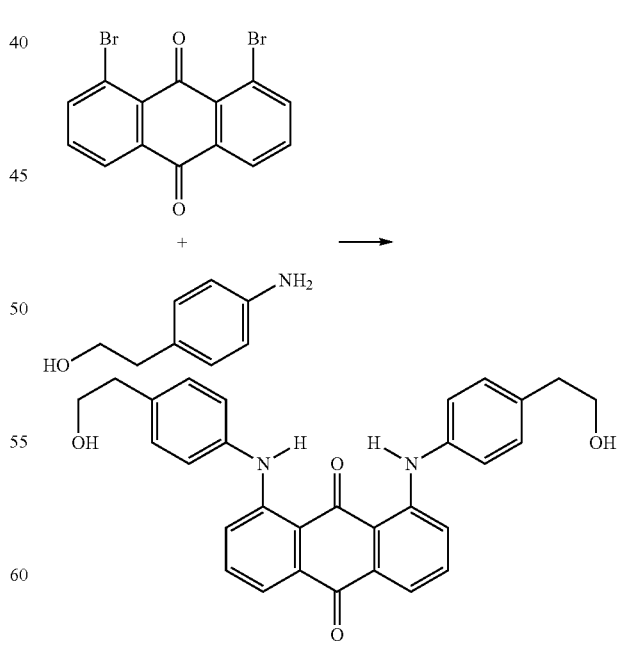

Intermediate 5 is prepared in a similar manner to Intermediate 1 except 1,8-dibromo-9,10-anthracenedione is used as the starting material.

Intermediate 6
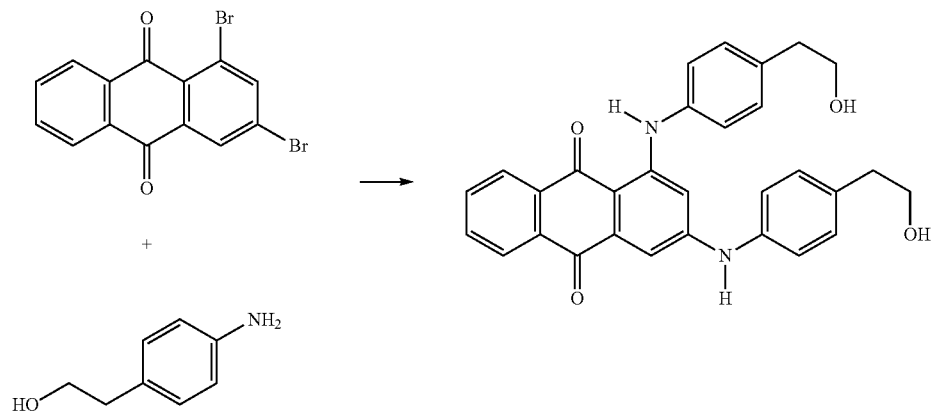
Intermediate 6 is prepared in a similar manner to Intermediate 1 except 1,3-dibromo-9,10-anthracenedione is used as the starting material.
Intermediate 7
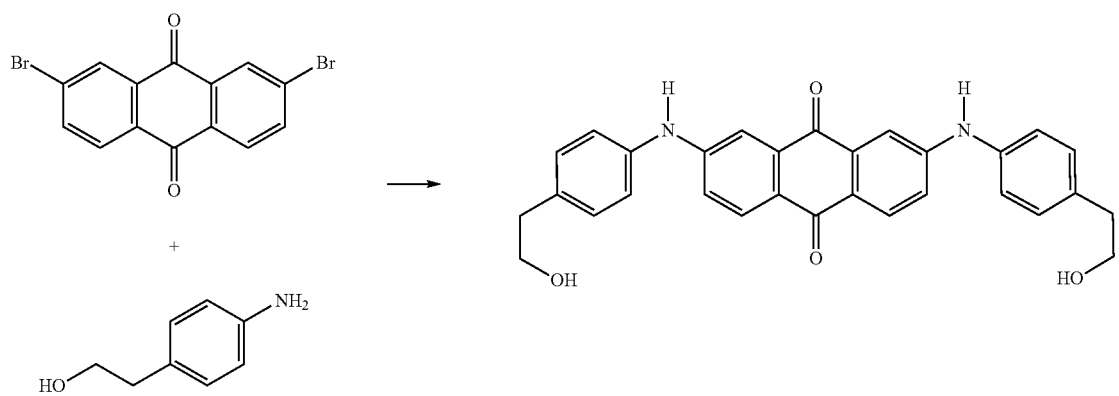
Intermediate 7 is prepared in a similar manner to Intermediate 1 except 2,7-dibromo-9,10-anthracenedione is used as the starting material.
Compound 1
Route A
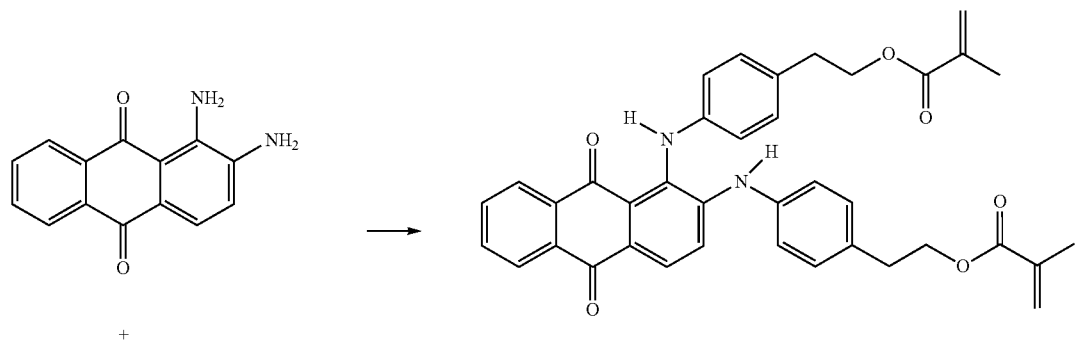

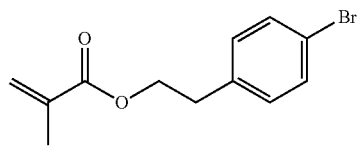

Compound 1 is prepared in a similar manner to Dye 1 except 1,2-diaminoanthraquinone is used as the starting material.

Route B

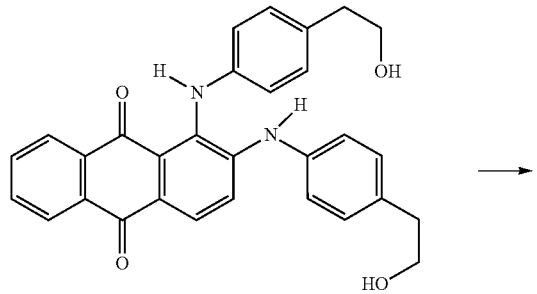

→

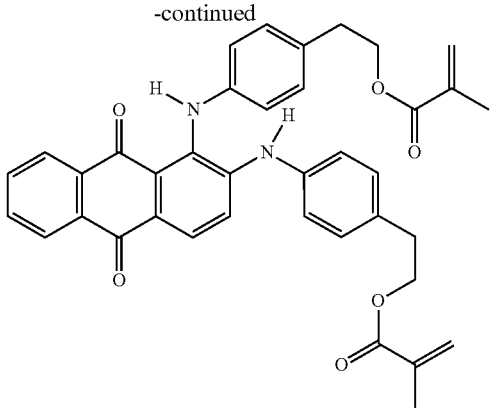

To a mixture of Intermediate 1 (1 g), anhydrous acetonitrile (15 cm³) and triethanolamine (2 g) is added dropwise methacryloyl chloride (1 cm³). The mixture is then stirred for 5 hours at 23° C. Ethylene glycol (20 cm³) is added followed by water to give a precipitate. The crude is collected by filtration followed by purification by column chromatography to give Compound 1.

Compound 2

Route A

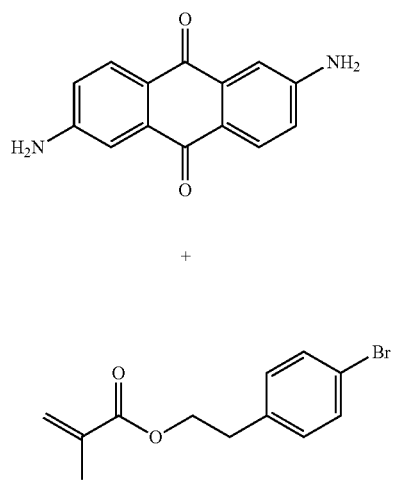

→

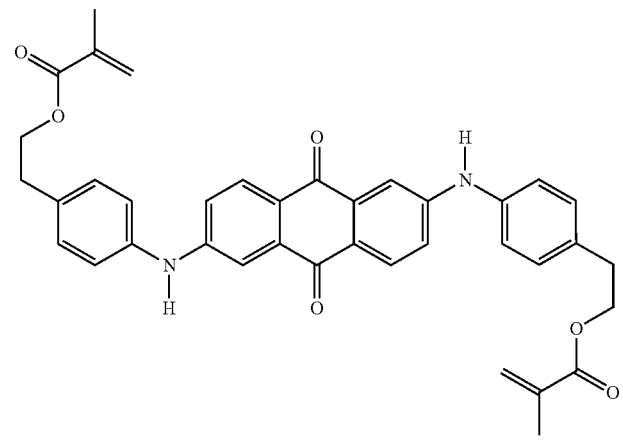

Compound 2 is prepared in a similar manner to Compound 1 (Route A) except 2,6-diaminoanthraquinone is used as the starting material.

Route B
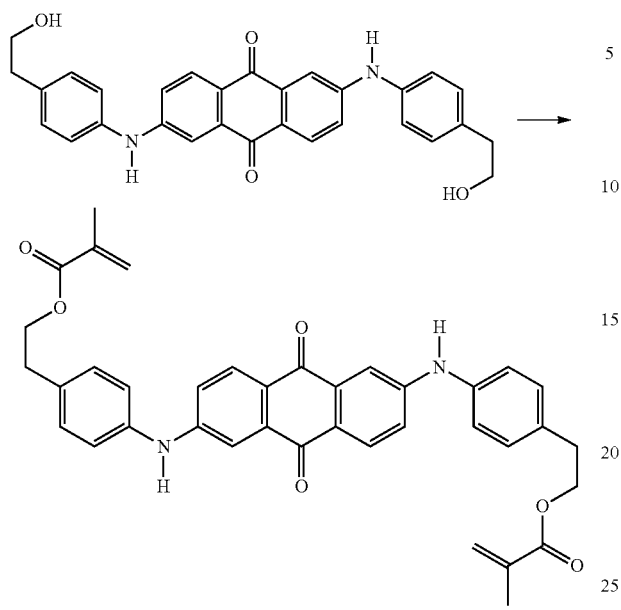
Compound 2 is prepared in a similar manner to Compound 1 (Route B) except Intermediate 2 is used as the starting material.
Compound 3
Route A
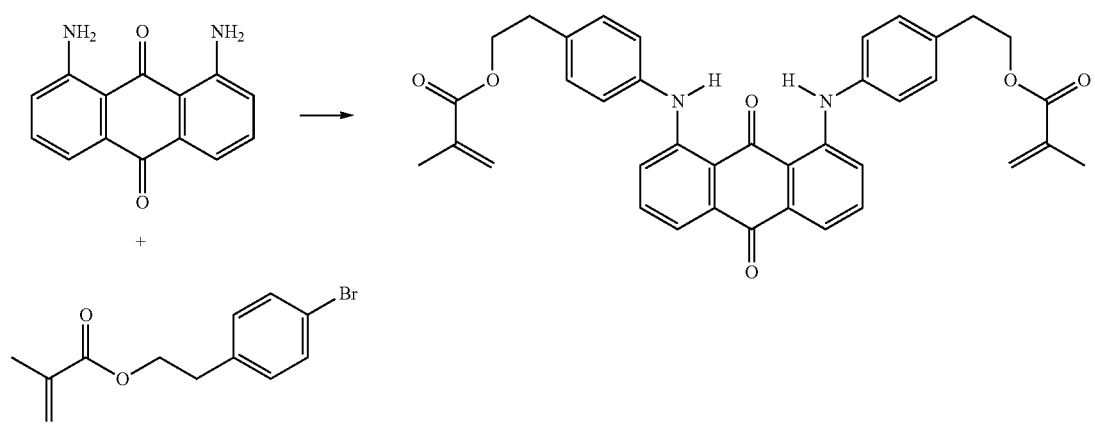
Compound 3 is prepared in a similar manner to Compound 1 (Route A) except 1,8-diaminoanthraquinone is used as the starting material.
Route B
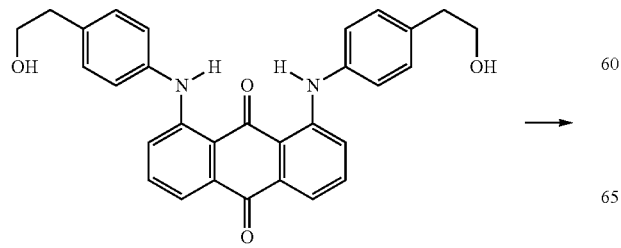

-continued

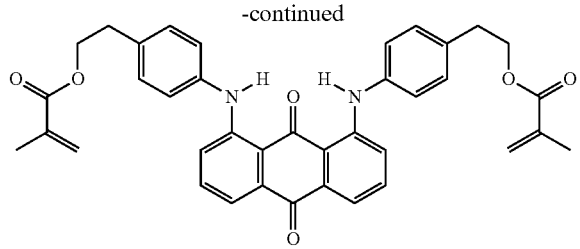

Compound 3 is prepared in a similar manner to Compound 1 (Route B) except Intermediate 5 is used as the starting material.

Compound 4

Route A

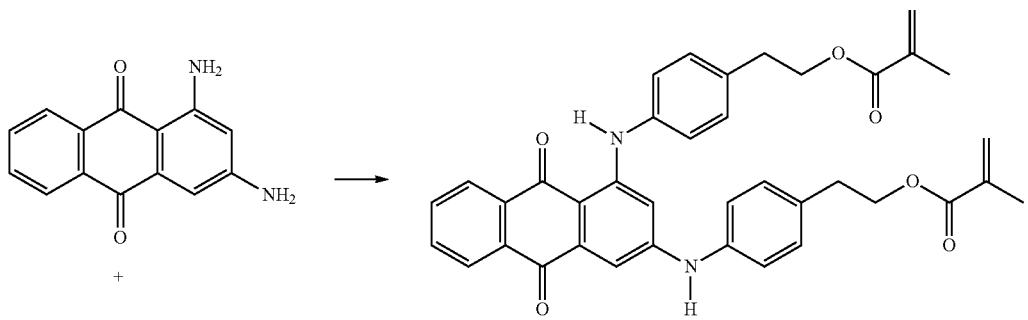

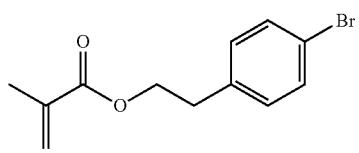

Compound 4 is prepared in a similar manner to Compound 1 (Route A) except 1,3-diaminoanthraquinone is used as the starting material.

Route B

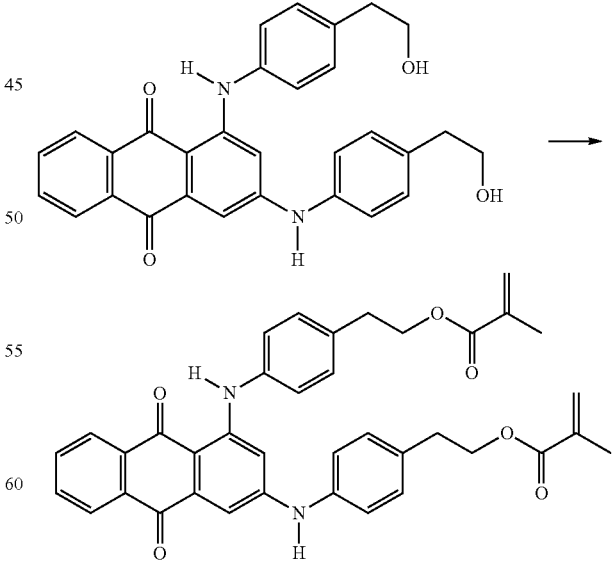

Compound 4 is prepared in a similar manner to Compound 1 (Route B) except Intermediate 6 is used as the starting material.

Compound 5
Route A
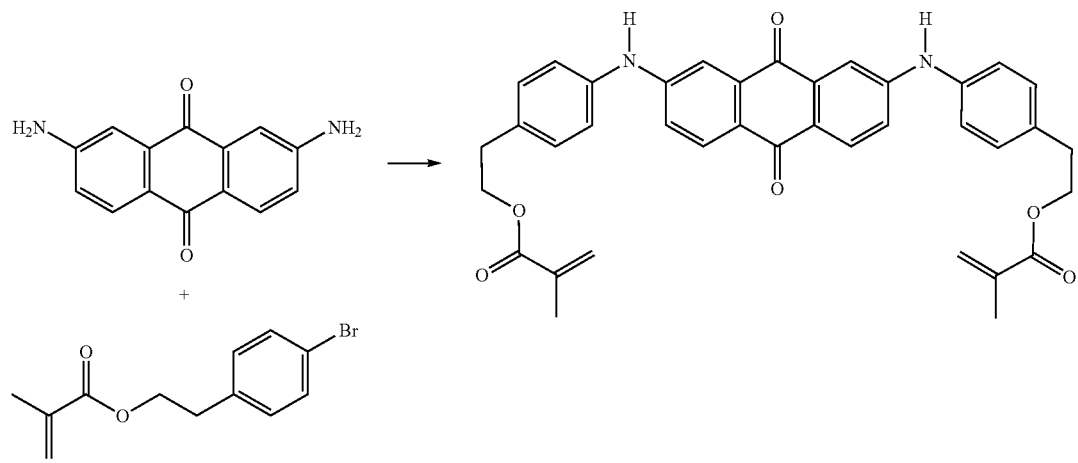
Compound 5 is prepared in a similar manner to Compound 1 (Route A) except 2,7-diaminoanthraquinone is used as the starting material.
Route B
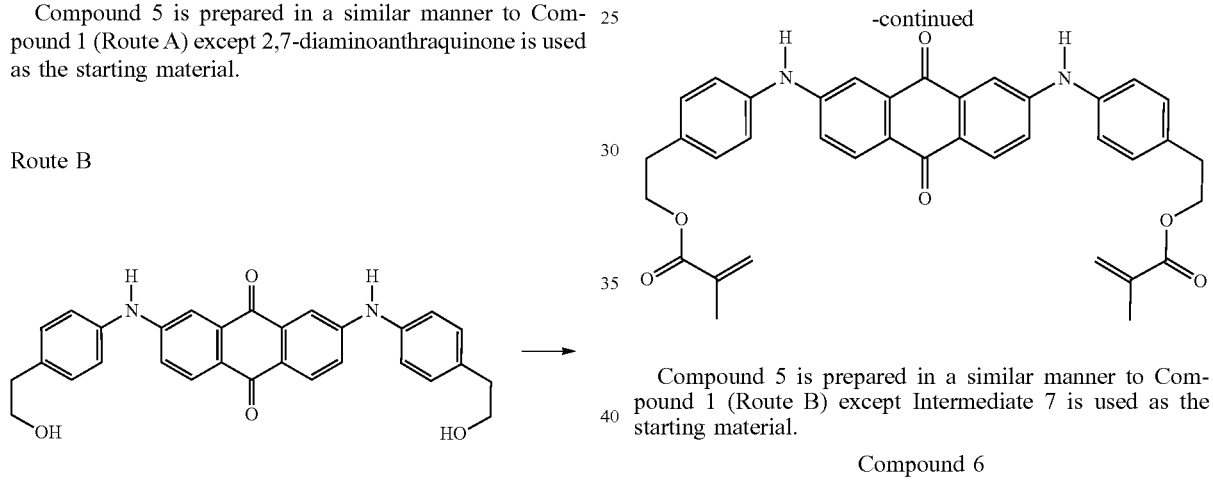
Compound 5 is prepared in a similar manner to Compound 1 (Route B) except Intermediate 7 is used as the starting material.
Compound 6
Route A
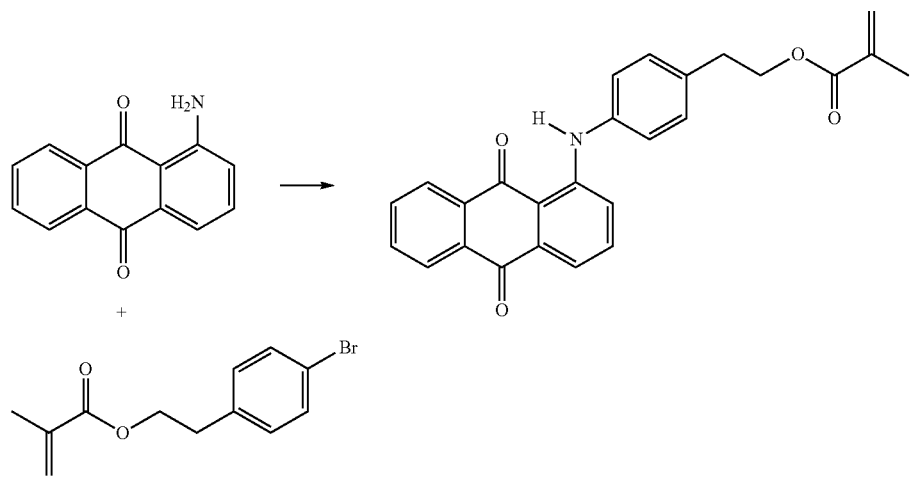

Compound 6 is prepared in a similar manner to Compound 1 (Route A) except 1-aminoanthraquinone is used as the starting material and only 1 equivalent of 4-bromophenylethyl methacrylate is used.

Route B

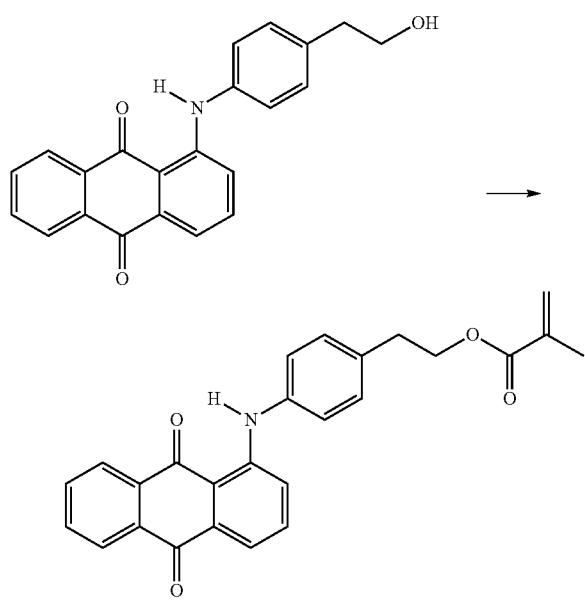

Compound 6 is prepared in a similar manner to Compound 1 (Route B) except Intermediate 3 is used as the starting material.

Compound 7

Route B

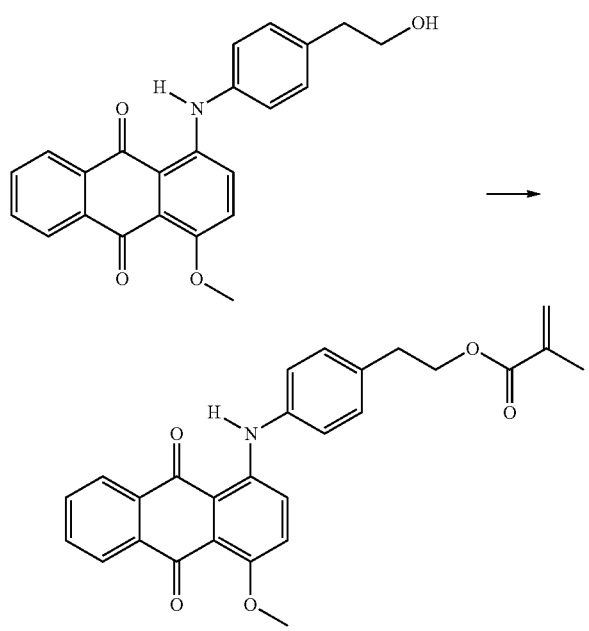

Compound 7 is prepared in a similar manner to Compound 1 (Route B) except Intermediate 4 is used as the starting material.

EXAMPLES—LENS FABRICATION

The following chemicals are referred to herein and may be referred to by their abbreviations.

RB246: 1,4-Bis(4-(2-methacryloxyethyl)phenylamino)anthraquinone (CAS number 121888-69-5)

RY86-HEMA: 2-propenoic acid, 2-methyl-, 2-[[4-[[5-[2-[5-(aminocarbonyl)-1-ethyl-1,6dihydro-2-hydroxy-4-methyl-6-oxo-3-pyridinyl]-2,4-disulfophenyl]amino]-6-chloro-1,3,5-triazin-2-yl]oxy]ethyl ester, sodium salt (1:2). (CAS number 2254162-81-5);

Silicone Hydrogel Contact Lens Fabrication and Testing Procedure

The chemical compounds set forth in examples were, for each example, weighed out in amounts corresponding to the described unit parts, and combined to form a mixture. The mixture was filtered through a 0.2-5.0 micron syringe filter into a bottle. Mixtures were stored for up to 2 weeks. The mixtures are understood to be polymerizable silicone hydrogel contact lens precursor compositions, or as used herein, polymerizable compositions. In the examples, the listed amounts of ingredients are given as unit parts of the polymerizable composition by weight.

A volume of the polymerizable composition was cast moulded by placing the composition in contact with a lens defining surface of a female mould member. In all the following examples, the moulding surface of the female mould member was formed of a non-polar resin, specifically polypropylene, although polar resins, such as polybutylene terephthalate (PBT) could also be used. A male mould member was placed in contact with the female mould member to form a contact lens mould assembly comprising a contact lens shaped cavity containing the polymerizable composition. In the following examples, the moulding surface of the male mould member was formed of a non-polar resin, specifically polypropylene.

Contact lens mould assemblies were placed in a nitrogen flushed oven to allow the precursor compositions to thermally cure to a lens-shaped polymerization product. For all the examples, the contact lens mould assemblies were exposed to temperatures of at least about 55° C. for about 2 hours. Examples of curing profiles which can be used to cure silicone hydrogel contact lenses described herein include exposing the contact lens mould assemblies to temperatures of 65° C. for 40 minutes, 80° C. for 40 minutes, and 100° C. for 40 minutes. Other contact lenses can be made with the same curing profile, but instead of the first temperature being at 65° C., it can be at 55° C.

In another method the contact lens mould assemblies can be exposed to UV light, such as UVA or UVA+ for at least 30 minutes to allow the precursor compositions to UV cure to a lens-shaped polymerization product.

After polymerizing the polymerizable compositions, the contact lens mould assemblies were demoulded to separate the male and female mould members. The lens-shaped polymerization product remained adhered to the male mould or the female mould.

A dry demoulding process where the mould assembly is not contacted with a liquid medium can be used, or alternatively a wet demoulding process where the mould assembly is contacted with a liquid medium such as, for example, water or an aqueous solution, can be used. A mechanical dry demoulding process can involve applying mechanical force to a portion of one or both of the mould members in order to separate the mould members. In all the following examples, a dry demoulding process was used.

The polymerized contact lens body was then delensed from the male mould or female mould to produce a delensed polymerized contact lens body. In one example of a delensing method, the polymerized contact lens body can be delensed from the male mould member using a dry delensing process, such as by manually peeling the lens from the male mould member or by compressing the male mould member and directing a gas toward the male mould member and the polymerized contact lens body and lifting the dry polymerized contact lens body with a vacuum device from the male mould member, which is discarded. In other methods, the polymerized contact lens body can be delensed using a wet delensing process by contacting the dry polymerized contact lens body with a liquid releasing medium, such as water or an aqueous solution. For example, a male mould member with the attached polymerized contact lens body can be dipped into a receptacle containing a liquid until the polymerized contact lens body separates from the male mould member. Or, a volume of liquid releasing medium can be added to the female mould to soak the polymerized contact lens body in the liquid and to separate the lens body from the female mould member. In the following Examples, a dry delensing process was used. Following separation, the lens body can be lifted from the mould member manually using tweezers or using a vacuum device and placed into a tray.

In the following examples, following the dry demoulding and dry delensing steps, the dry lens-shaped polymerization products were placed in cavities of trays, and the lens-shaped polymerization products were then washed to remove extractable materials from the polymerized contact lens body and hydrated.

The extraction and hydration liquids used in the extraction and hydration process consisted of denatured ethanol, a 50/50 mixture of denatured ethanol and deionised water, and deionised water. Specifically, in the examples below, the extraction and hydration process used comprised at least one extraction step in denatured ethanol followed by a 50:50 mixture of ethanol water followed by at least one extraction step in deionised water, and wherein each extraction and hydration step lasted from about 15 minutes to about 3 hours at a temperature between 20 and 30° C.

Washed, extracted and hydrated lenses were then placed individually in contact lens blister packages with a phosphate buffered saline packaging solution. The blister packages were sealed and sterilized by autoclaving.

Following sterilization, lens properties such as wet lens diameter, base curve, refractive index, water content, UV-vis spectra, and the like were determined, as described herein.

The diameter and sagittal height of each lens was measured in phosphate buffered saline) using an Optimec and the base curve radius was calculated.

The wet centre thickness (CT) of the lenses was measured using a Rehder CT gauge. The contact lenses were removed from an aqueous solution and any excess solution removed by touching lightly on a lint free tissue. The lens was placed centrally on the ball mount and an anvil pin was lowered until it contacted the surface of the lens. The CT reading was noted.

For lenses of the following Examples the refractive index (RI) was measured using a CLR-12-70 Index Refractometer. The contact lenses were removed from an aqueous solution and any excess solution removed by shaking or touching lightly on a lint free tissue. The contact lens was then placed on the curved presser and the lid closed, latch engaged with the RI reading taken once stabilised.

The UV-vis spectra of the lenses were measured using a Perkin Elmer Lambda 35 UV/Vis Spectrophotometer based on the method described in ISO 18369 part 3. Spectra were run with lenses in an aqueous solution in a flat cuvette cell with a V insert and holder. The cuvette opening allowed the lens to maintain its natural shape during the measurement, i.e., its optical path was greater than the sag of the lens, and its height and width was greater than the diameter of the lens. The cuvette holder has an opening that allows the incident light beam centered on the optical zone of the lens. The baseline was autozeroed using deionised water. The scan range was between 780 to 270 nm, at a data interval of 1 nm and a slit width of 1 nm. The Visible, Blue light, UVA and UVB lens transmittance was calculated for each lens and for each example the average results from 5-10 lenses was reported.

Visible light transmissibility=Average % T between 780 nm to 380 nm

Blue light transmissibility=Average % T between 415 and 455 nm

UVA=Average % T between 380 nm to 315 nm

UVB=Average % T between 315 nm to 280 nm

Example 1

The polymerizable composition for stenfilcon A was used as a base formulation. To this base formulation dyes were added according to the formulations in Table 1, and batches of silicone hydrogel contact lenses were prepared using these formulations and tested in accordance with the fabrication procedure and test methods described, using a dry demoulding process, a dry delensing process, and an extraction and hydration, packaging and sterilisation process as described above.

RY86 is a yellow dye used for blue light blocking and is a first colourant according to the present disclosure.

The Red Dye is a second colourant according to the present disclosure and corresponds to Dye 1 made in the synthesis examples above.

The Violet Dye is a second colourant according to the present disclosure and corresponds to Dye 2 made in the synthesis examples above.

The Blue Dye is RB246 and is a third colourant according to the present disclosure.

TABLE 2

Colourant levels in the Example Lens Polymerizable Compositions

| Example | RY86HEMA | Red dye | Violet dye | Blue dye |
|---------|----------|---------|------------|----------|
| A | 350 ppm | | | |
| B | 350 ppm | 500 ppm | | |
| C | 350 ppm | 300 ppm | | |
| D | 350 ppm | | 300 ppm | |
| E | 350 ppm | | 100 ppm | |
| F | 350 ppm | 500 ppm | | 290 ppm |
| G | 350 ppm | 300 ppm | | 290 ppm |
| H | 350 ppm | | 300 ppm | 290 ppm |
| I | 350 ppm | | 100 ppm | 290 ppm |
| J | 350 ppm | | | 290 ppm |
| K | 350 ppm | | 100 ppm | 90 ppm |
| L | 350 ppm | | | 200 ppm |

Light transmissibility of the lenses was measured as described above and results are given in Table 3.

TABLE 3

Light Transmissibility Results of the Example Lenses

| Example | % T UVA 316-380 nm | % T UVB 280-315 nm | % Visible 380-780 nm | % T Blue Light 415 to 455 nm |
|---|---|---|---|---|
| A | 5.13 | 0.09 | 95.36 | 89.65 |
| B | 5.35 | 0.09 | 91.91 | 82.97 |
| C | 4.85 | 0.07 | 92.29 | 83.49 |
| D | 5.34 | 0.09 | 92.49 | 87.38 |
| E | 5.47 | 0.10 | 94.93 | 89.38 |
| F | 5.33 | 0.10 | 88.15 | 79.89 |
| G | 5.51 | 0.12 | 90.92 | 83.22 |
| H | 5.10 | 0.08 | 89.67 | 84.37 |
| I | 4.96 | 0.05 | 91.12 | 84.64 |
| J | 5.56 | 0.10 | 92.54 | 85.74 |
| K | 5.37 | 0.10 | 92.95 | 86.65 |

The centre thickness, diameter, base curve radius and refractive index was measured for each of the example lenses and results are given in Table 4. The measurements were carried out on a sample of from 5 to 10 lenses with the results being averaged.

TABLE 4

Centre Thickness, Diameter, Base Curve Radius and Refractive Index results of the Example Lenses

| Example | Average CT (mm) | Average Diameter (mm) | Average BCR (mm) | Average RI |
|---|---|---|---|---|
| A | 0.109 | 14.47 | 8.91 | 1.398 |
| B | 0.095 | 14.37 | 8.89 | 1.399 |
| C | 0.106 | 14.40 | 8.90 | 1.398 |
| D | 0.094 | 14.39 | 8.92 | 1.399 |
| E | 0.098 | 14.43 | 8.93 | 1.399 |
| F | 0.094 | 14.28 | 8.80 | 1.401 |
| G | 0.088 | 14.33 | 8.85 | 1.398 |
| H | 0.095 | 14.28 | 8.80 | 1.399 |
| I | 0.094 | 14.11 | 8.66 | 1.401 |
| J | 0.093 | 14.40 | 8.87 | 1.399 |
| K | 0.097 | 14.40 | 8.85 | 1.398 |

Contact lens formulations were prepared having the individual dye concentrations shown in Table 5 for the purpose of measuring the absorption maximum of each lens.

TABLE 5 absorption maxima ($\lambda_{max}$) of the contact lenses containing single dyes

| RY86-HEMA | Red dye | Violet dye | Blue dye | CT (mm) | λmax (nm) | Max Abs |
|---|---|---|---|---|---|---|
| 350 | 0 | 0 | 0 | 0.109 | 421 | 0.0580 |
| 0 | 500 | 0 | 0 | 0.144 | 541 | 0.0533 |
| 0 | 0 | 500 | 0 | 0.093 | 585 | 0.0560 |

The $\lambda_{max}$ values in Table 5 for the red and violet dyes are slightly different from the values when measured in methanol solution (Table 1), but that difference is believed to be mainly due to the relatively broad shape of those peaks.

The colour of the example lenses was measured according to the following method.

Lens colour was measured using a Sheen Micromatch model 181/3 colorimeter. The colourimeter was calibrated using the black and white calibration standards and the calibration checked using the green calibration plate. The following settings were used for measurements: the colour system selected was CIELab, the Index setting is ΔE*, The illuminant was set at D65 and the observer was set at 10°. The hydrogel contact lens to be measured was removed from the packaging solution and gently blotted to remove surface moisture and placed on a white plastic ball mounting ensuring that no air bubbles were trapped beneath the lens. The mounting with the lens in place was then held against the aperture of the colourimeter and the measurement taken. This procedure was repeated ten times and the average reading calculated. A clear lens was used as a control, and the colour measurement readings were normalised by assigning the clear lens on the white background as having an a* value of zero and *b value of zero. Standard commercially-available lenses with handling tint were also measured for comparison, lens types used were Biofinity, MyDay, Acuvue Oasys, B+L Ultra and Alcon Dailies Total 1. The CIELab L*C*h* values were calculated from the measured CIELab L* a* and b* values using standard conversion equations, L8=L*, C*=(a2+b2)½, and h°=arctan (b*/a*).

The lens colour results for lenses A-L are given in Table 6 and plotted in FIG. 1 as an L*a*b* plot together with the values for the commercially-available lenses and for lenses having different concentrations of either the Red dye (Dye 1) or the Violet dye (Dye 2).

TABLE 6

L*a*b* and L*C*h* Results for the Example Contact Lenses A to L

| Example | L* | a* | b* | L* | C* | h* (deg) |
|---|---|---|---|---|---|---|
| A | 54.6 | −2.3 | 4.8 | 54.6 | 5.4 | 116 |
| B | 50.2 | 1.6 | 5.3 | 50.2 | 5.6 | 73 |
| C | 51.6 | 0.1 | 5.8 | 51.6 | 5.8 | 89 |
| D | 50.9 | −2.2 | 1.2 | 50.9 | 2.5 | 152 |
| E | 53.2 | −2.4 | 3.7 | 53.2 | 4.4 | 123 |
| F | 48.1 | −0.3 | 2.7 | 48.1 | 2.8 | 96 |
| G | 49.5 | −2.4 | 3.7 | 49.5 | 4.4 | 122 |
| H | 47.4 | −4.7 | 0.2 | 47.4 | 4.7 | 177 |
| I | 50.1 | −4.4 | 2.8 | 50.1 | 5.2 | 148 |
| J | 52.2 | −6.2 | 4.6 | 52.2 | 7.7 | 144 |
| K | | | not measured | | | |
| L | 52.2 | −5.5 | 6.4 | 52.2 | 8.4 | 131 |

It can be seen from FIG. 1 and Table 6 that Example lens A, which contains only the blue-blocking yellow dye RY86 (colourant 1) is in the upper left region of FIG. 1, corresponding to a strong yellow coloration. It can also be seen from the two arrows shown on FIG. 1 that lenses comprising increasing amounts of either the Red or the Violet dye as the only colourant trend generally in the opposite directions, that is, further into the lower right region of the colour space, indicating that it is possible to balance the yellow colour of the blue-blocking dye by adding appropriate amounts of those Red and Violet dyes. Lens L, which included the yellow dye, RY86 (a First Colourant) and the blue dye, RB246 (a Second Colourant) is also in the upper-left quadrant, corresponding to a strong green coloration. The lenses A-J are generally closer to the origin at the centre of the plot, indicating relatively lower levels of colour. The commercially-available lenses all have very low levels of colour and are close to the origin.

Visual assessment of the lenses A-L indicated that lenses D, E, F, G and H were grey or blue, and in accordance with the invention, whereas lenses A, B, C, I, J, K and L were not grey or blue, and are not in accordance with the invention. Lenses D, E, F, and G were each grey in appearance and had chroma (C*) values of less than 5.0 and a Hue (h*) value of 166 degrees or less, or greater than or equal to 275 degrees. Lens H, which was blue, had a Hue (h*) value of greater than 166 degrees, and less than 275 degrees, as well as a chroma (C*) value of less than 5.0.

EMBODIMENTS

Various embodiments of the invention are as set forth below:

Embodiment 1) A contact lens comprising a polymeric matrix formed from the polymerization of a polymerizable composition comprising one or more monomers, a first colourant which is a blue-blocking colourant having an absorption maximum ($\lambda_{max}$) in the range of from 415 nm to 455 nm and a second colourant, wherein the second colourant is a polymerizable dye having an absorption maximum ($\lambda_{max}$) in the range of from 470 nm to 600 nm, and optionally also comprising a third colourant which is a colourant having an absorption maximum in the range of from greater than 600 nm to 800 nm, wherein the second colourant and, if present, the third colourant, balance the colour of the first colourant such that the contact lens is colourless, grey or blue.

Embodiment 2) A contact lens according to embodiment 1 in which the first colourant is also polymerizable and the polymeric matrix is formed from the polymerization of a polymerizable composition comprising the one or more monomers, the first colourant and the second colourant.

Embodiment 3) A contact lens according to embodiment 1 or embodiment 2 in which the first colourant is not polymerizable.

Embodiment 4) A contact lens according to any preceding embodiment in which the second colourant is an anthraquinone dye.

Embodiment 5) A contact lens according to any preceding embodiment in which the second colourant is a dye and contains a chromophore and at least one polymerizable group wherein each polymerizable group is connected to the chromophore by a linking group.

Embodiment 6) A contact lens according to any preceding embodiment in which the second colourant is a dye of formula (1)

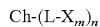  (1)

where Ch is a chromophore, L is a linking group or heteroatom, X is a polymerizable group, m is from 1 to 3 and n is from 1 to 3.

Embodiment 7) A contact lens according to embodiment 5 or 6 in which m=1 and the linking group L is —N(H)—$R^1$—, —$SR^1$— or —$OR^1$— where $R^1$ is a divalent hydrocarbylene group, which may be substituted or unsubstituted by one or more heteroatoms.

Embodiment 8) A contact lens according to any of embodiments 5 to 7 in which the linking group L comprises a C6 to C14 aryl group, a C1 to C20 alkyl group, or a C7 to C20 aryl-alkyl group.

Embodiment 9) A contact lens according to any preceding embodiment in which the chromophore Ch is an anthraquinone chromophore which preferably comprises from 1 to 3 substituents selected from —F, —Cl, —Br, —I, —$OR^2$, —$SR^2$, —$R^2$, —$NO_2$, —CN, —NCO, —NCS, —C(=O)$R^2$, —C(=O)$OR^2$, —$NH_2$, —C(=O)NH$R^2$, —C(=O)N($R^2$)$_2$, where each $R^2$ is independently H or C1 to C20 hydrocarbyl.

Embodiment 10) A contact lens according to any preceding embodiment in which the second colourant is a dye is according to formula (2)

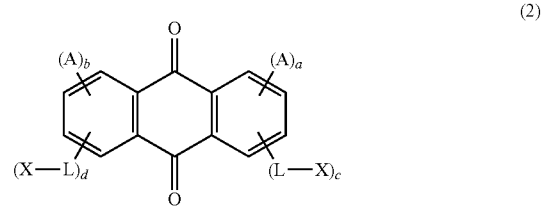  (2)

where a and b can each be from 0 to 3 provided that 0≤(a+b)≤3; each A is independently selected from —F, —Cl, —Br, —I, —$OR^2$, —$SR^2$, —$R^2$, —$NO_2$, —CN, —NCO, —NCS, —C(=O)$R^2$, —C(=O)$OR^2$, —$NR^2_2$, —C(=O)NH$R^2$, —C(=O)N($R^2$)$_2$, where each $R^2$ is independently H or C1 to C20 hydrocarbyl; c and d can each be from 0 to 3 provided that 1≤(c+d)≤3; L is a divalent linking group; and X is a polymerizable group.

Embodiment 11) A contact lens according to any preceding embodiment in which the second colourant is a dye is according to formula (3) or formula (4):

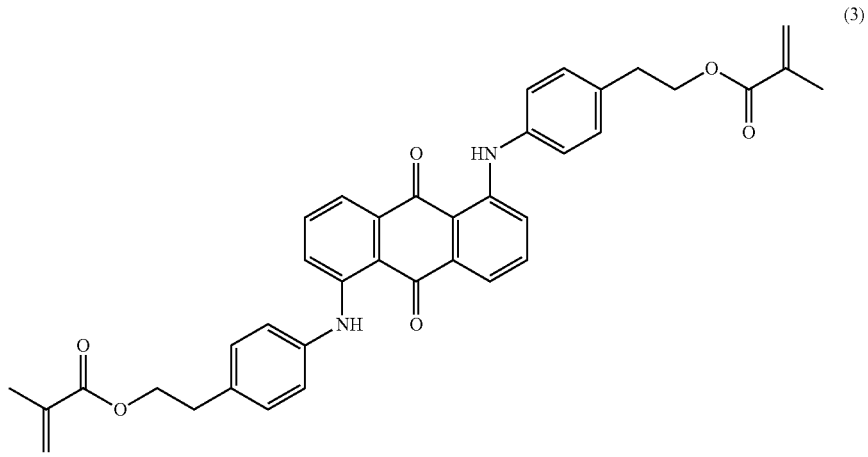  (3)

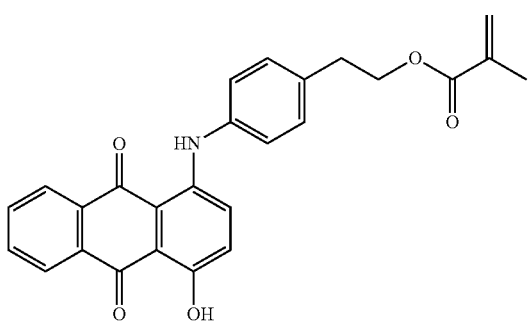

(4)

Embodiment 12) A contact lens according to any preceding embodiment in which the second colourant has an absorption maximum ($\lambda_{max}$) in the range of from 500 nm to 600 nm.

Embodiment 13) A contact lens according to any preceding embodiment in which the first colourant is present in an amount of from about 20 ppm to about 1000 ppm on a dry basis and/or the second colourant is present in an amount of from about 20 ppm to about 1000 ppm on a dry basis.

Embodiment 14) A contact lens according to any preceding embodiment in which the third colourant is present in an amount of from about 20 ppm to about 300 ppm on a dry basis.

Embodiment 15) A contact lens according to any preceding embodiment in which the polymerizable composition comprises a total amount of siloxane monomer of about 20 wt. % to about 60 wt. % based on the total weight of all polymerizable ingredients in the polymerizable composition.

Embodiment 16) A contact lens according to any preceding embodiment in which the polymerizable composition comprises a total amount of hydrophilic vinyl-containing monomer of about 20 wt. % to about 60 wt. % based on the total weight of all polymerizable ingredients in the polymerizable composition.

Embodiment 17) A contact lens according to embodiment 16 in which the hydrophilic vinyl-containing monomer is N-vinyl-N-methylacetamide (VMA), or N-vinyl pyrrolidone (NVP), or a combination of both VMA and NVP.

Embodiment 18) A contact lens according to any preceding embodiment in which the polymerizable composition comprises an acrylate-containing hydrophilic monomer in an amount up to about 20 wt. % based on the total weight of all polymerizable ingredients in the polymerizable composition.

Embodiment 19) A contact lens according to any preceding embodiment which is a hydrogel contact lens.

Embodiment 20) A contact lens according to any preceding embodiment which is a silicone hydrogel contact lens.

Embodiment 21) A contact lens according to any preceding embodiment which also comprises from 0.5 wt % to 2.0 wt % on a dry basis of a UV-absorbing compound.

Embodiment 22) A contact lens according to any preceding embodiment in which the first colourant, the second colourant and the third colourant, if present, are dyes which are soluble in the polymerizable composition.

Embodiment 23) A contact lens according to any preceding embodiment in which the first colourant, the second colourant and the third colourant, if present, are autoclave stable such they do not change colour or intensity of colour upon autoclaving of the contact lens.

Embodiment 24) A contact lens according to any preceding embodiment which does not substantially change colour during autoclaving.

Embodiment 25) A contact lens according to any preceding embodiment which has a visible light transmissibility of at least 80% as measured according to BS EN ISO 18369-3-2017 section 4.8.

Embodiment 26) A contact lens comprising a polymeric matrix, a first colourant which is a blue-blocking colourant having an absorption maximum ($\lambda_{max}$) in the range of from 415 nm to 455 nm and a second colourant, wherein the second colourant is a polymerizable anthraquinone dye having an absorption maximum ($\lambda_{max}$) in the range of from 470 nm to 600 nm according to any of embodiments 5 to 11.

Embodiment 27) A method of making a contact lens comprising the steps of polymerizing a polymerizable composition comprising one or more monomers, a first colourant which is a blue-blocking colourant having an absorption maximum ($\lambda_{max}$) in the range of from 415 nm to 455 nm and a second colourant, wherein the second colourant is a polymerizable dye having an absorption maximum ($\lambda_{max}$) in the range of from 470 nm to 600 nm, and optionally also comprising a third colourant which is a colourant having an absorption maximum in the range of from greater than 600 nm to 800 nm, in a mould to form a lens-shaped polymerization product comprising a polymeric matrix, wherein the second colourant and, if present, the third colourant, balance the colour of the first colourant such that the contact lens is colourless, grey or blue.

Embodiment 28) A method according to embodiment 27 which also includes the step of hydrating the lens-shaped polymerization product to form a hydrogel contact lens.

Embodiment 29) A method according to embodiment 28 in which the hydrogel contact lens has a visible light transmissibility of at least 80% as measured according to BS EN ISO 18369-3-2017 section 4.8.

Embodiment 30) A method according to any of embodiments 27 to 29 which also includes the step of immersing the polymerization product or the hydrogel contact lens in a package containing a packaging solution, sealing the package, and optionally sterilizing the sealed package.

Embodiment 31) A method according to any of embodiments 27 to 30 in which the polymerizable composition comprises from 20 ppm to 1000 ppm of the first colourant based on the total weight of all polymerizable ingredients in the polymerizable composition and/or from 20 ppm to 1000 ppm of the second colourant based on the total weight of all polymerizable ingredients in the polymerizable composition.

Embodiment 32) A method according to any of embodiments 27 to 31 in which first colourant is also polymerizable.

Embodiment 33) A method according to any of embodiments 27 to 32 in which the polymerizable composition also comprises from 0.5 wt % to 2.0 wt % of a UV-absorbing compound based on the total weight of all polymerizable ingredients in the polymerizable composition.

Embodiment 34) A method according to any of embodiments 27 to 33 which is a method of making a contact lens according to any of embodiments 1 to 26.

Embodiment 35) A packaged contact lens comprising a sealed package containing a packaging solution and a contact lens according to any of embodiments 1 to 26 or as made according to the method of any of embodiments 27 to 33.

The invention has been described above with reference to numerous optional features and specific examples. Many variations will suggest themselves to those skilled in this art in light of the above description. All such obvious variations are within the full intended scope of the claims.

The invention claimed is:

1. A contact lens comprising a polymeric matrix formed from the polymerization of a polymerizable composition comprising one or more monomers, a first colourant which is a blue-blocking colourant having an absorption maximum ($\lambda_{max}$) in the range of from 415 nm to 455 nm and a second colourant, wherein the second colourant is a polymerizable dye having an absorption maximum ($\lambda_{max}$) in the range of from 470 nm to 600 nm, wherein the first colourant and the second colourant are present in the contact lens, and the second colourant balances the colour of the first colourant such that the contact lens is colourless, grey or blue.

2. The contact lens as claimed in claim 1 in which the second colourant is an anthraquinone dye.

3. The contact lens as claimed in claim 1 in which the second colourant is a dye and contains a chromophore and at least one polymerizable group wherein each polymerizable group is connected to the chromophore by a linking group.

4. The contact lens as claimed in claim 1 in which the second colourant is a dye of formula (1)

$$\text{Ch-(L-X}_m)_n \quad (1)$$

where Ch is a chromophore, L is a linking group or heteroatom, X is a polymerizable group, m is from 1 to 3 and n is from 1 to 3.

5. The contact lens as claimed in claim 4 in which m=1 and the linking group L is —N(H)—R¹—, —SR¹— or —OR¹— where R¹ is a divalent hydrocarbylene group, which is substituted or unsubstituted by one or more heteroatoms.

6. The contact lens as claimed in claim 4 in which the linking group L comprises a C6 to C14 aryl group, a C1 to C20 alkyl group, or a C7 to C20 aryl-alkyl group.

7. The contact lens as claimed in claim 4 in which the chromophore Ch is an anthraquinone chromophore which comprises from 1 to 3 substituents selected from —F, —Cl, —Br, —I, —OR², —SR², —R², —NO₂, —CN, —NCO, —NCS, —C(=O)R², —C(=O)OR², —NH², —C(=O)NHR², —C(=O)N(R²)₂, where each R² is independently H or C1 to C20 hydrocarbyl.

8. The contact lens as claimed in claim 1 in which the second colourant is a dye is according to formula (2)

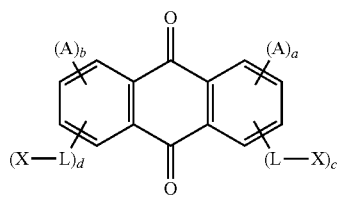

where a and b can each be from 0 to 3 provided that 0≤(a+b)≤3; each A is independently selected from —F, —Cl, —Br, —I, —OR², —SR², —R², —NO₂, —CN, —NCO, —NCS, —C(=O)R², —C(=O)OR², —NR²₂, —C(=O)NHR², —C(=O)N(R²)₂, where each R² is independently H or C1 to C20 hydrocarbyl; c and d can each be from 0 to 3 provided that 1≤(c+d)≤3; L is a divalent linking group; and X is a polymerizable group.

9. The contact lens as claimed in claim 1 in which the second colourant is a dye is according to formula (3) or formula (4):

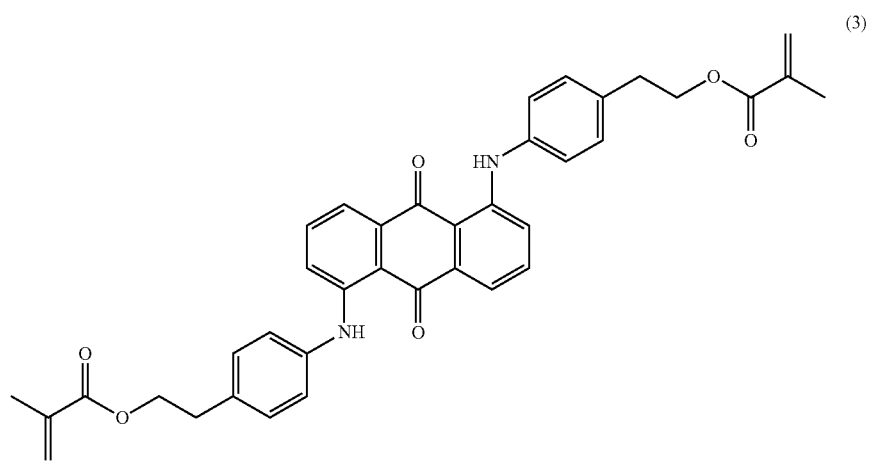

-continued

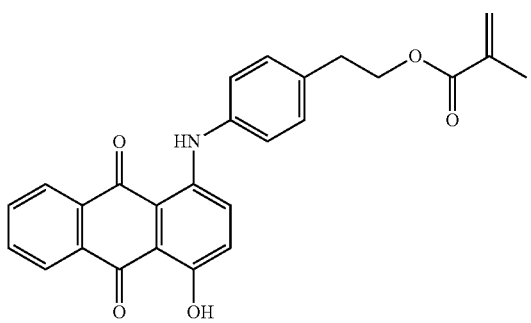

(4)

10. The contact lens as claimed in claim 1 in which the second colourant has an absorption maximum ($\lambda_{max}$) in the range of from 500 nm to 600 nm.

11. The contact lens as claimed in claim 1 in which the first colourant is present in the contact lens in an amount of from about 20 ppm to about 1000 ppm on a dry basis and/or the second colourant is present in the contact lens in an amount of from about 20 ppm to about 1000 ppm on a dry basis.

12. The contact lens as claimed in claim 1 in which the polymerizable composition comprises a total amount of siloxane monomer of about 20 wt. % to about 60 wt. % based on the total weight of all polymerizable ingredients in the polymerizable composition.

13. The contact lens as claimed in claim 1 in which the polymerizable composition comprises a total amount of hydrophilic vinyl-containing monomer of about 20 wt. % to about 60 wt. % based on the total weight of all polymerizable ingredients in the polymerizable composition.

14. The contact lens as claimed in claim 1 which is a hydrogel contact lens.

15. The contact lens as claimed in claim 1 in which the first colourant and the second colourant are autoclave stable such that they do not change colour or intensity of colour upon autoclaving of the contact lens.

16. A packaged contact lens comprising a sealed package containing a packaging solution and a contact lens as claimed in claim 1.

17. The contact lens as claimed in claim 1 wherein the polymerizable composition further comprises a third colourant that is present in the contact lens, the third colourant being a colourant having an absorption maximum in the range of from above 600 nm but no higher than 800 nm, and the second colourant and third colourant balance the colour of the first colourant such that the contact lens is colourless, grey or blue.

18. The contact lens as claimed in claim 17 in which the third colourant is present in the contact lens in an amount of from about 20 ppm to about 300 ppm on a dry basis.

19. A method of making a contact lens comprising the steps of polymerizing a polymerizable composition comprising one or more monomers, a first colourant which is a blue-blocking colourant having an absorption maximum ($\lambda_{max}$) in the range of from 415 nm to 455 nm and a second colourant, wherein the second colourant is a polymerizable dye having an absorption maximum ($\lambda_{max}$) in the range of from 470 nm to 600 nm,
in a mould to form a lens-shaped polymerization product comprising a polymeric matrix, wherein the second colourant balances the colour of the first colourant such that the contact lens is colourless, grey or blue.

20. The method as claimed in claim 19 which also includes the step of hydrating the lens-shaped polymerization product to form a hydrogel contact lens.

21. The method as claimed in claim 19 which also includes the step of immersing the polymerization product or the hydrogel contact lens in a package containing a packaging solution, sealing the package, and sterilizing the sealed package.

22. The method as claimed in claim 19 wherein the polymerizable composition further comprises a third colourant which is a colourant having an absorption maximum in the range of from above 600 nm but no higher than 800 nm, and the second colourant and the third colourant balance the colour of the first colourant such that the contact lens is colourless, grey or blue.

* * * * *